(12) United States Patent
Platt et al.

(10) Patent No.: US 10,671,239 B2
(45) Date of Patent: Jun. 2, 2020

(54) THREE DIMENSIONAL DIGITAL CONTENT EDITING IN VIRTUAL REALITY

(71) Applicant: Sony Interactive Entertainment America LLC, San Mateo, CA (US)

(72) Inventors: Stuart Platt, San Mateo, CA (US); Mohammed Aafaq Khan, Poway, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 114 days.

(21) Appl. No.: 15/845,125

(22) Filed: Dec. 18, 2017

(65) Prior Publication Data

US 2019/0187876 A1   Jun. 20, 2019

(51) Int. Cl.
| | |
|---|---|
| *G06F 3/048* | (2013.01) |
| *G06F 3/0481* | (2013.01) |
| *G06T 19/20* | (2011.01) |
| *G06F 3/01* | (2006.01) |
| *G06F 3/16* | (2006.01) |
| *G11B 27/031* | (2006.01) |
| *H04N 13/344* | (2018.01) |
| *G06F 3/0482* | (2013.01) |

(52) U.S. Cl.
CPC .......... *G06F 3/04815* (2013.01); *G06F 3/011* (2013.01); *G06F 3/013* (2013.01); *G06F 3/017* (2013.01); *G06F 3/0482* (2013.01); *G06F 3/167* (2013.01); *G06T 19/20* (2013.01); *G11B 27/031* (2013.01); *H04N 13/344* (2018.05)

(58) Field of Classification Search
CPC ...... G06F 3/04815; G06F 3/167; G06F 3/017; H04N 13/344; G11B 27/031; G06T 19/20
See application file for complete search history.

(56) References Cited

U.S. PATENT DOCUMENTS

| | | | | |
|---|---|---|---|---|
| 2010/0281383 | A1* | 11/2010 | Meaney ................ | G11B 27/34 715/723 |
| 2014/0189535 | A1* | 7/2014 | Simonyi ............... | G06Q 50/01 715/753 |
| 2015/0243058 | A1* | 8/2015 | Cook .................... | G06T 11/206 345/419 |
| 2018/0121069 | A1* | 5/2018 | DiVerdi .............. | G06F 3/04847 |

* cited by examiner

*Primary Examiner* — Matthew Ell
(74) *Attorney, Agent, or Firm* — Penilla IP, APC

(57) ABSTRACT

A method for editing. The method includes receiving a sequence of interactive VR scenes of digital content, each interactive VR scene showing a 3D gaming environment. The method includes placing the sequence of interactive VR scenes within a 3D editing space. The method includes sending a view of the 3D editing space including at least one of the sequence of interactive VR scenes to an HMD for viewing by the user. The method includes receiving at least one input editing command from a device of the user. The method includes modifying the sequence of interactive VR scenes in response to the input editing command, wherein the at least one editing command is provided through an input enabled while wearing the HMD and viewing the 3D editing space via the HMD so as to provide real-time views showing modifications made to the sequence of interactive VR scenes.

21 Claims, 24 Drawing Sheets

THREE DIMENSIONAL DIGITAL CONTENT EDITING IN VIRTUAL REALITY

TECHNICAL FIELD

The present disclosure is related to three dimensional (3D) digital content, such as a 3D gaming worlds of gaming applications. Among other things, this disclosure describes methods and systems for the editing of 3D digital content within a virtual editing environment.

BACKGROUND OF THE DISCLOSURE

Video gaming has increasingly become more popular with the advancement of video game technology. For example, high powered graphics processors provide an unbelievably viewing and interactive experience when playing a video game. In addition, displays are being designed with higher and higher resolutions. For example, present technology includes displays having 2K resolution (e.g., 2.2 megapixels over 2048×1080 pixels) with an aspect ratio of approximately 19:10. Other displays having 4K UHD (Ultra high definition) resolution (e.g., 8.2 megapixels over 3840×2160 pixels) with an aspect ratio of 16:9 are now pushing into the market and is expected to gain traction. Increased graphics processing capabilities along with high resolution displays provide for a heretofore unbelievable viewing experience for the user, especially when playing a video game executed on a gaming engine designed to take advantage of the higher resolution displays.

Because of the use of high powered graphics, game developers are creating 3D immersive and interactive gaming applications. The 3D content found in these gaming applications include 3D gaming environments that are built by adding increasing number of objects within a 3D space. To be realistic, these objects may follow the normal laws of physics that define object interaction.

The creation of the 3D gaming environment involves multiple editing steps. For example, the game developer uses a 3D content creator application to generate the 3D gaming environment. Typically, the game developer views the interface of the 3D content creator application on a two-dimensional (2D) display to make edits. The edits are then included with the 3D content, which is converted and compiled for viewing in a head mounted display (HMD) configured for stereoscopic viewing. If the game developer decides that the edits produce unsatisfactory results, then he or she must go back to the 2D display to modify the previously made edits. To check the results, the edits are then converted and compiled for 3D viewing in the HMD. This process may repeat over and over until the results are satisfactory.

One of the problems with this process is the disconnect between the generated 3D content and the 2D editing environment. Specifically, edits to the 3D gaming environment are made without exactly knowing what the 3D content looks like as viewed in the HMD. This is because the edits are made using an interface of the 3D content creator application on a 2D display. The same problems exist when generating 3D video content that may not necessarily be interactive content.

It would be beneficial to bring closer together the editing environment with the resulting 3D gaming environment and/or 3D video content.

It is in this context that embodiments of the disclosure arise.

SUMMARY

Embodiments of the present disclosure relate to providing a three dimensional (3D) editing space for editing 3D digital content, such as 3D gaming environments of a gaming applications, 3D videos, etc. The 3D editing space is configured for editing of digital content, to include the arranging, the rearranging of digital content, interactive VR scenes, digital sub-scenes, video scenes, video frames, etc. Moreover, the 3D editing space allows for real-time viewing of the results of the editing process, such that the editor can make edits while wearing a head mounted display (HMD) configured for stereoscopic or 3D viewing, and viewing of the results from the edits without removing the HMD.

In one embodiment, a method for editing digital content is disclosed. The method includes receiving a sequence of interactive VR scenes of digital content, each interactive VR scene showing a 3D gaming environment. The method includes placing the sequence of interactive VR scenes within a 3D editing space. The method includes sending a view of the 3D editing space including at least one of the sequence of interactive VR scenes to an HMD for viewing by the user. The method includes receiving at least one input editing command from a device of the user. The method includes modifying the sequence of interactive VR scenes in response to the input editing command. The at least one editing command is provided through an input enabled while wearing the HMD and viewing the 3D editing space via the HMD so as to provide real-time views showing modifications made to the sequence of interactive VR scenes.

In still another embodiment, a computer system is disclosed. The computer system including a processor and memory, wherein the memory is coupled to the processor and having stored therein instructions that, if executed by the computer system, cause the computer system to execute a method for editing. The method includes receiving a sequence of interactive VR scenes of digital content, each interactive VR scene showing a 3D gaming environment. The method includes placing the sequence of interactive VR scenes within a 3D editing space. The method includes sending a view of the 3D editing space including at least one of the sequence of interactive VR scenes to an HMD for viewing by the user. The method includes receiving at least one input editing command from a device of the user. The method includes modifying the sequence of interactive VR scenes in response to the input editing command. The at least one editing command is provided through an input enabled while wearing the HMD and viewing the 3D editing space via the HMD so as to provide real-time views showing modifications made to the sequence of interactive VR scenes.

In another embodiment, a non-transitory computer-readable medium storing a computer program for implementing a graphics pipeline is disclosed. The computer-readable medium includes program instructions for editing. The computer-readable medium includes program instructions for receiving a sequence of interactive VR scenes of digital content, each interactive VR scene showing a 3D gaming environment. The computer-readable medium includes program instructions for placing the sequence of interactive VR scenes within a 3D editing space. The computer-readable medium includes program instructions for sending a view of the 3D editing space including at least one of the sequence of interactive VR scenes to an HMD for viewing by the user.

The computer-readable medium includes program instructions for receiving at least one input editing command from a device of the user. The computer-readable medium includes program instructions for modifying the sequence of interactive VR scenes in response to the input editing command. The at least one editing command is provided through an input enabled while wearing the HMD and viewing the 3D editing space via the HMD so as to provide real-time views showing modifications made to the sequence of interactive VR scenes.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure relate to providing a three dimensional (3D) editing space for editing 3D digital content, such as 3D gaming environments of gaming applications, 3D videos, etc. The 3D editing space is configured for editing of digital content, to include the arranging, the rearranging of digital content, interactive VR scenes, digital sub-scenes, video scenes, video frames, etc. In addition, the 3D editing space is responsive to input commands delivered through a mouse, keyboard, motion controllers, other user interfaces. In addition, the 3D editing space may be responsive to input commands delivered through the tracking of body parts, to include hand gestures, body gestures, etc. The 3D editing space may include a sequence of interactive VR scenes including digital content. The sequence of interactive VR scenes may be arranged in linear fashion within the 3D editing space for purposes of viewing and editing of interactive VR scenes. Also, the sequence of interactive VR scenes may be arranged in a helical manner within the 3D editing space for purposes of viewing and editing of interactive VR scenes. Moreover, the 3D editing space allows for real-time viewing of the results of the editing process, such that the editor can make edits while wearing a head mounted display (HMD) configured for stereoscopic or 3D viewing, and viewing of the results from the edits without removing the HMD. In that manner, the editor is not encumbered with repeatedly putting on and removing the HMD while moving between an editing space (which could be virtual 2D editing environment) when editing the content and a 3D viewing space when reviewing the edited content.

With the above general understanding of the various embodiments, example details of the embodiments will now be described with reference to the various drawings.

Throughout the specification, the reference to "video game" or "gaming application" is meant to represent any type of interactive application that is directed through execution of input commands. For illustration purposes only, an interactive application includes applications for gaming, word processing, video processing, video game processing, etc. Further, the terms video game and gaming application are interchangeable. In addition, the reference to "digital content" is meant to represent 2D or 3D digital content to include, in part, video games, gaming applications, and videos.

Figure 1A:
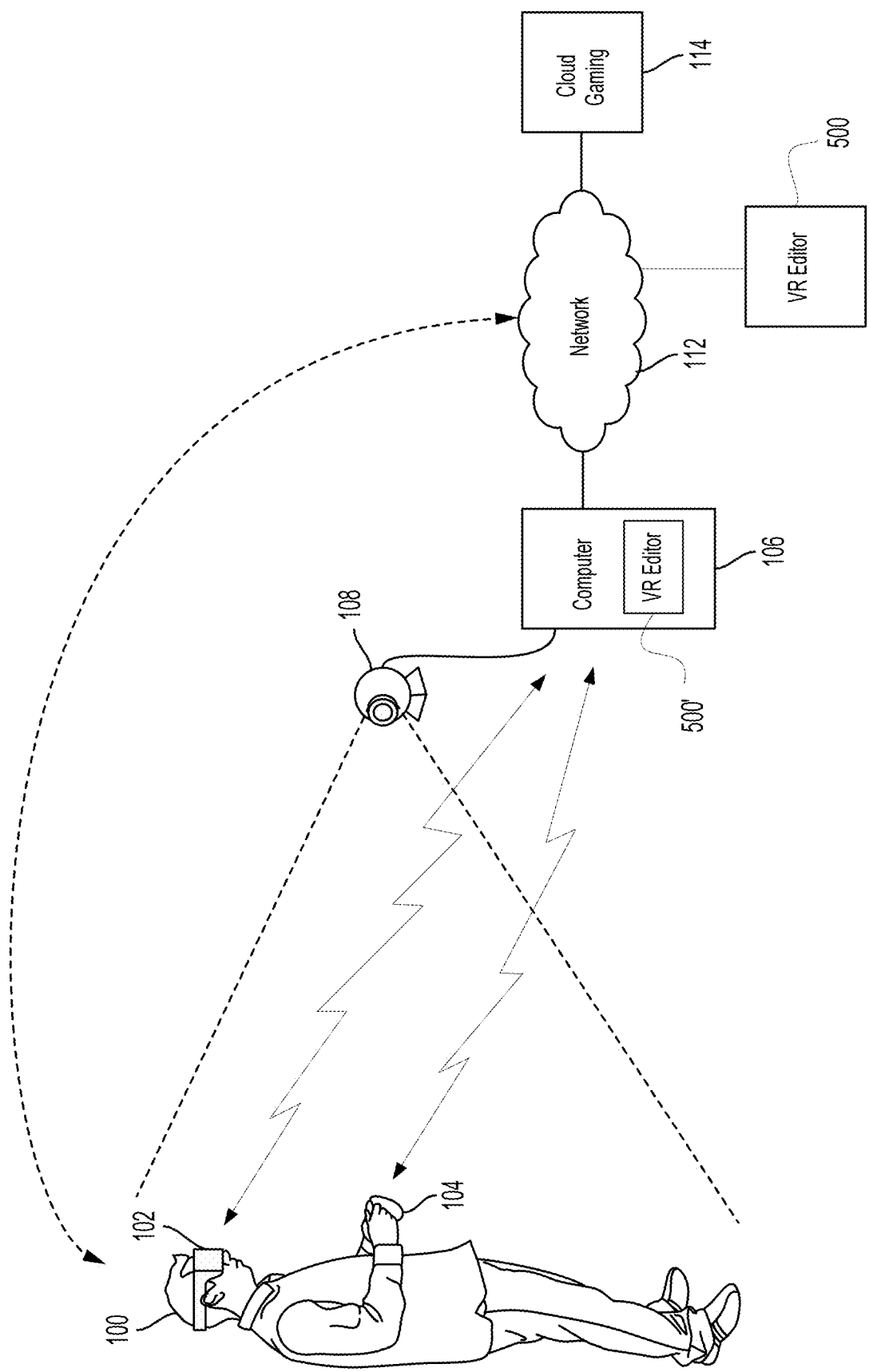
FIG. 1A illustrates a system configured for providing an interactive experience with VR content and for providing a 3D editing space for editing of 3D digital content wherein some input control for editing may be provided through a handheld controller, and some input control for editing may be managed through tracking of body parts as implemented through a camera, in accordance with one embodiment of the present disclosure.

FIG. 1A illustrates a system for interactive gameplay of a video game, in accordance with an embodiment of the invention. A user 100 is shown wearing an HMD 102, wherein the HMD 102 is worn in a manner similar to glasses, goggles, or a helmet, and is configured to display a video game from an interactive video game or other content from interactive application, to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In one embodiment, the HMD 102 can be connected to a computer or gaming console 106. The connection to computer 106 can be wired or wireless. In some implementations, the HMD 102 may also communicate with the computer through alternative mechanisms or channels, such as via network 112 to which both HMD 102 and the computer 106 are connected. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102. The computer 106 is not restricted to executing a video game but may also be configured to execute an interactive application, which outputs VR content 191 for rendering by the HMD 102. In one embodiment, computer 106 is configured to via local VR editor 500' provide a 3D editing space for editing 3D digital content, such as 3D gaming environments of a gaming applications, 3D videos, etc., wherein the 3D editing space allows for real-time viewing of the results of the editing process, such that the editor can make edits while wearing an HMD configured for stereoscopic or 3D viewing, and viewing of the results from the edits without removing the HMD. In another embodiment, computer 106 is configured to work in combination with a back-end server that is configured to provide the 3D editing space.

The user 100 may operate a controller 104 to provide input for the video game or for editing 3D digital content. The connection to computer 106 can be wired or wireless. Additionally, a camera 108 can be configured to capture one or more images of the interactive environment in which the user 100 is located. These captured images can be analyzed to determine the location and movements of the user 100, parts of the user (e.g., tracking hand gestures for input commands), the HMD 102, and the controller 104. In one embodiment, the controller 104 includes a light or other marker elements which can be tracked to determine its location and orientation. Additionally, HMD 102 may include one or more lights which can be tracked to determine the location and orientation of the HMD 102. The tracking functionality as implemented in part by camera 108 provides for input commands generated through movement of the controller 104 and/or body parts (e.g., hand) of the user 100. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the video game being played by the user 102 and/or maintains and executes a 3D editing space used for editing 3D digital content. The computer 106 transmits inputs from the HMD 102, the controller 104 and the camera 108, to the cloud gaming provider, which processes the inputs to affect the game state of the executing video game.

The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas the haptic feedback data is used to generate a vibration feedback command, which is provided to the controller 104. In other embodiments, the computer 106 acts to interface with the VR editor 500 located at a back-end server that is configured to provide a 3D editing space for editing 3D digital content, such as 3D gaming environments of a gaming applications, 3D videos, etc., wherein the 3D editing space allows for real-time viewing of the results of the editing process, such that the editor can make edits while wearing an HMD configured for stereoscopic or 3D viewing, and viewing of the results from the edits without removing the HMD.

In one embodiment, the HMD 102, controller 104, and camera 108, may themselves be networked devices that connect to the network 110 to communicate with the cloud gaming provider 112. For example, the computer 106 may be a local network device, such as a router, that does not otherwise perform video game processing, but facilitates passage network traffic. The connections to the network by the HMD 102, controller 104, and camera (i.e., image capture device) 108 may be wired or wireless.

In yet another embodiment, the computer 106 may execute a portion of the video game, while the remaining portion of the video game may be executed on a cloud gaming provider 112. In other embodiments, portions of the video game may also be executed on HMD 102. For example, a request for downloading the video game from the computer 106 may be serviced by the cloud gaming provider 112. While the request is being serviced, the cloud gaming provider 112 may execute a portion of the video game and provide game content to the computer 106 for rendering on the HMD 102. The computer 106 may communicate with the cloud gaming provider 112 over a network 110. Inputs received from the HMD 102, the controller 104 and the camera 108, are transmitted to the cloud gaming provider 112, while the video game is downloading on to the computer 106. The cloud gaming provider 112 processes the inputs to affect the game state of the executing video game. The output from the executing video game, such as video data, audio data, and haptic feedback data, is transmitted to the computer 106 for onward transmission to the respective devices.

Once the video game has been completely downloaded to the computer 106, the computer 106 may execute the video game and resume game play of the video game from where it was left off on the cloud gaming provider 112. The inputs from the HMD 102, the controller 104, and the camera 108 are processed by the computer 106, and the game state of the video game is adjusted, in response to the inputs received from the HMD 102, the controller 104, and the camera 108. In such embodiments, a game state of the video game at the computer 106 is synchronized with the game state at the cloud gaming provider 112. The synchronization may be done periodically to keep the state of the video game current at both the computer 106 and the cloud gaming provider 112. The computer 106 may directly transmit the output data to the relevant devices. For example, video and audio streams are provided to the HMD 102, whereas the haptic feedback data is used to generate a vibration feedback command, which is provided to the controller 104.

Figure 1B:
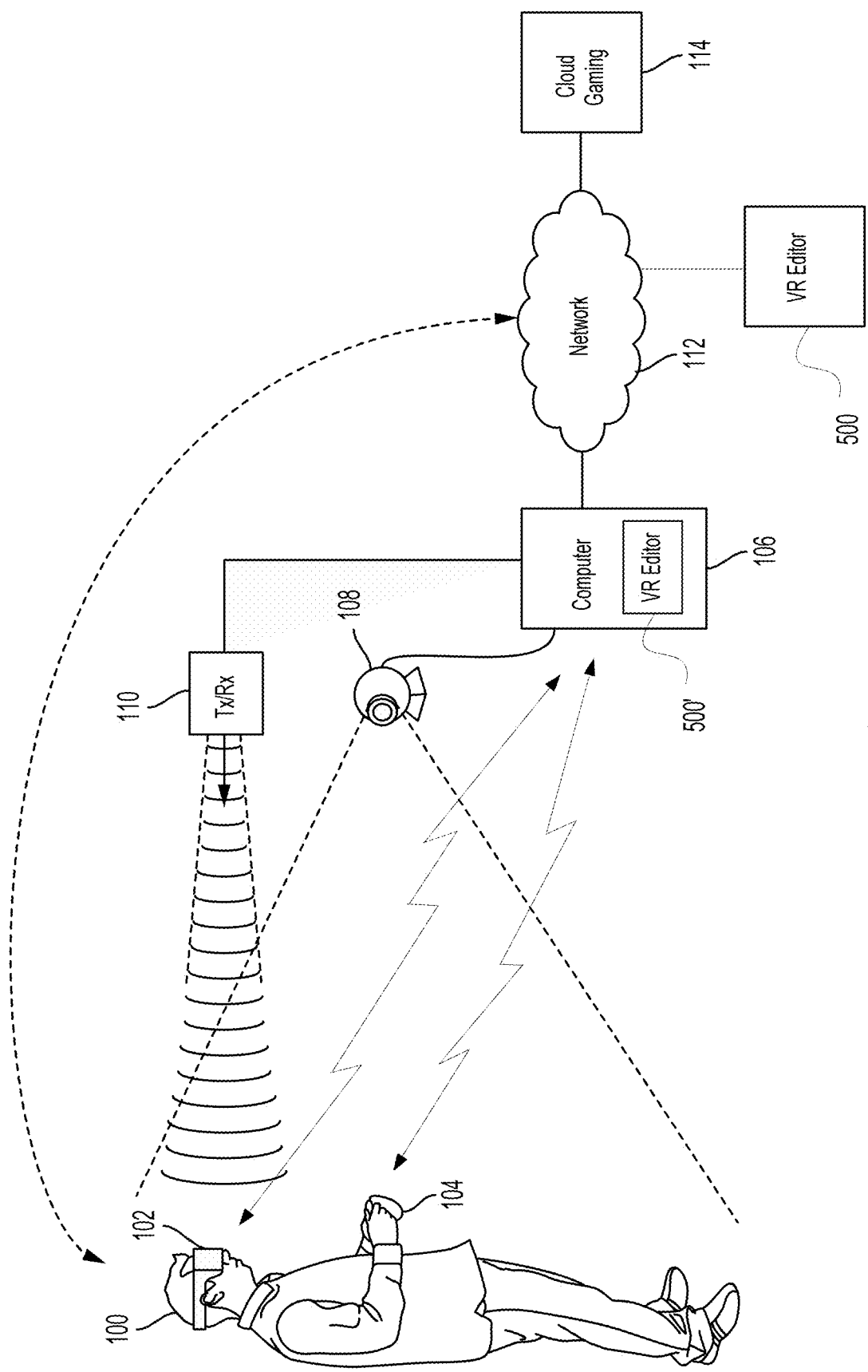
FIG. 1B illustrates a system configured for providing an interactive experience with VR content and for providing a 3D editing space for editing of 3D digital content wherein some input control for editing may be provided through a handheld controller, and some input control may be managed through tracking of body parts as implemented through a camera, wherein the camera also tracks movement of the HMD for purposes of beam tracking of an RF emitter transmitting data to the HMD, in accordance with one embodiment of the present disclosure.

FIG. 1B illustrates a system configured for providing an interactive experience with VR content and for providing a 3D editing space for editing of 3D digital content, in accordance with one embodiment of the present disclosure. FIG. 1B is similar to the system described in FIG. 1A, with the addition of the transmitter/receiver (transceiver) 110 that is configured for data delivery to the HMD 102 via RF signals, for example. The transceiver 110 is configured to transmit (by wired connection or wireless connection) the video and audio from the video game to the HMD 102 for rendering thereon. In addition, the transceiver 110 is configured to transmit images, video, and audio of 3D digital content within a 3D editing space for purposes of editing. In this implementation, camera 108 may be configured to track movement of the HMD 102, such that the transceiver 110 may beam steer the majority of its RF power (as delivered through an RF radiation pattern) to the HMD 102 (e.g., for purpose of delivering data), in accordance with one embodiment of the present disclosure.

Figure 1C:
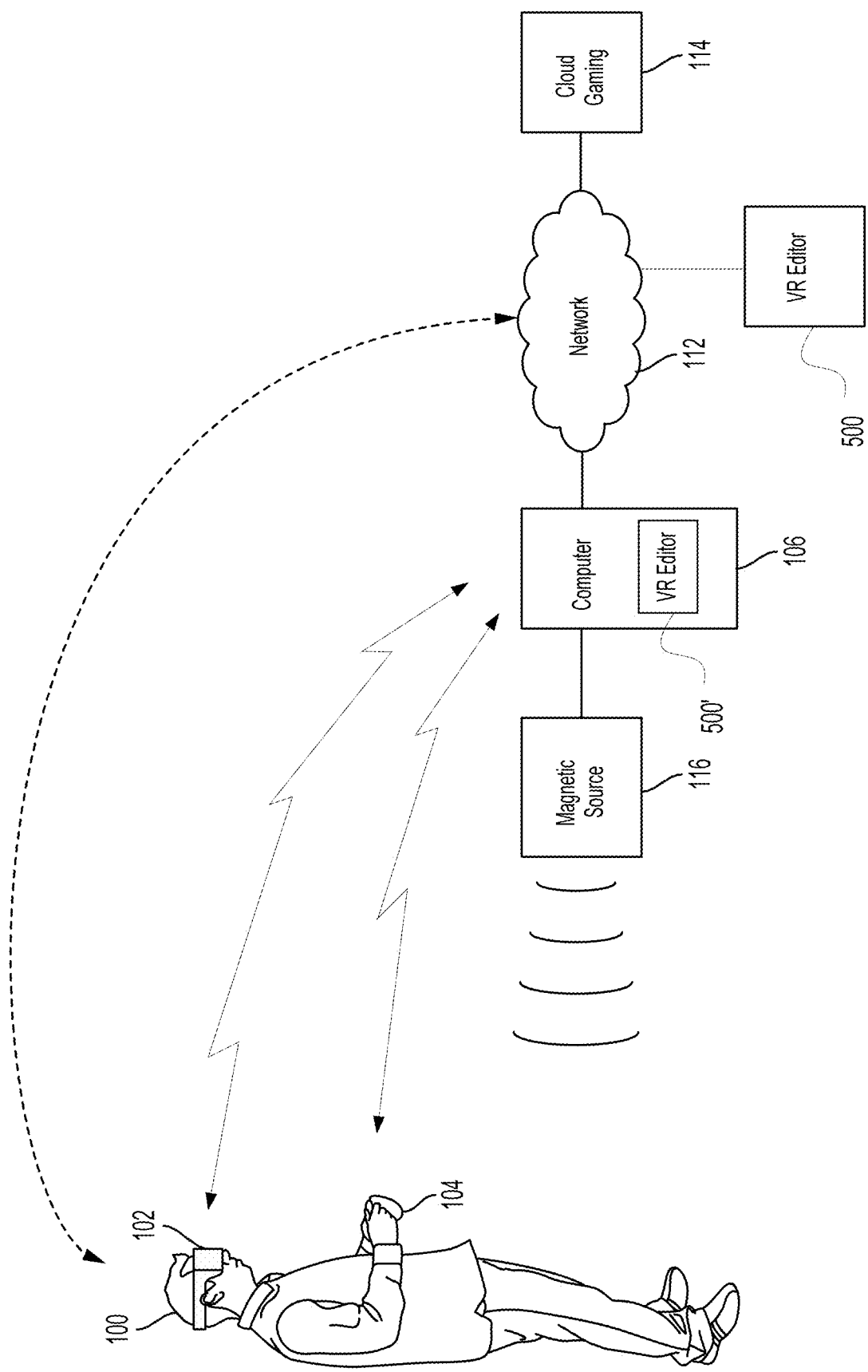
FIG. 1C illustrates a system configured for providing an interactive experience with VR content and for providing a 3D editing space for editing of 3D digital content wherein some input control for editing may be provided through a handheld controller, and some input control may be managed through the magnetic tracking of body parts as implemented in part through a magnetic source, in accordance with one embodiment of the present disclosure.

FIG. 1C illustrates a system configured for providing an interactive experience with VR content and for providing a 3D editing space for editing of 3D digital content, in accordance with one embodiment of the present disclosure. FIG. 1C is similar to the system described in FIG. 1A, with the addition of the magnetic source 116 configured to emit a magnetic field to enable magnetic tracking of the HMD 102, controller 104 (e.g., configured as an interface controller), or any object configured with magnetic sensors (e.g., gloves, strips located on body parts—such as fingers, etc.). For example, the magnetic sensors could be inductive elements. In particular, the magnetic sensors can be configured to detect the magnetic field (e.g., strength, orientation) as emitted by the magnetic source 116. The information gathered from the magnetic sensors can be used to determine and track the location and/or orientation of the HMD 102, controller 104, and other interface objects, etc. in order to provide input commands as executed within the 3D editing space. For instance, hand gestures may be used to provide input editing commands. In embodiments, the magnetic tracking is combined with tracking performed through the camera 108 and/or inertial sensors within the HMD 102, controller 104 and/or other interface objects.

In some implementations, the interface object (e.g., controller 104) is tracked relative to the HMD 102. For example, the HMD 102 may include an externally facing camera that captured images including the interface object. In other embodiments, HMD 102 may include an IR emitter used for tracking external objects, such as the interface object. The captured images may be analyzed to determine the location/orientation of the interface object relate to the HMD 102, and using a known location/orientation of the HMD 102, so as to determine the location/orientation and/or movement of the interface object in the local environment.

The way the user 100 interfaces with the virtual reality scene of a gaming application, or of the 3D editing space, displayed in the HMD 102 can vary, and other interface devices in addition to the interface object (e.g., controller 104), can be used. For instance, various kinds of single-handed, as well as two-handed controllers 104 can be used. In some implementations, the controllers 104 themselves can be tracked by tracking lights included in the controllers, or tracking of shapes, sensors, and inertial data associated with the controllers 104. Using these various types of controllers 104, or even simply hand gestures that are made and captured by one or more cameras, and magnetic sensors, it is possible to interface, control, maneuver, interact with, and participate in the virtual reality gaming and/or editing environment presented on the HMD 102.

Figure 2:
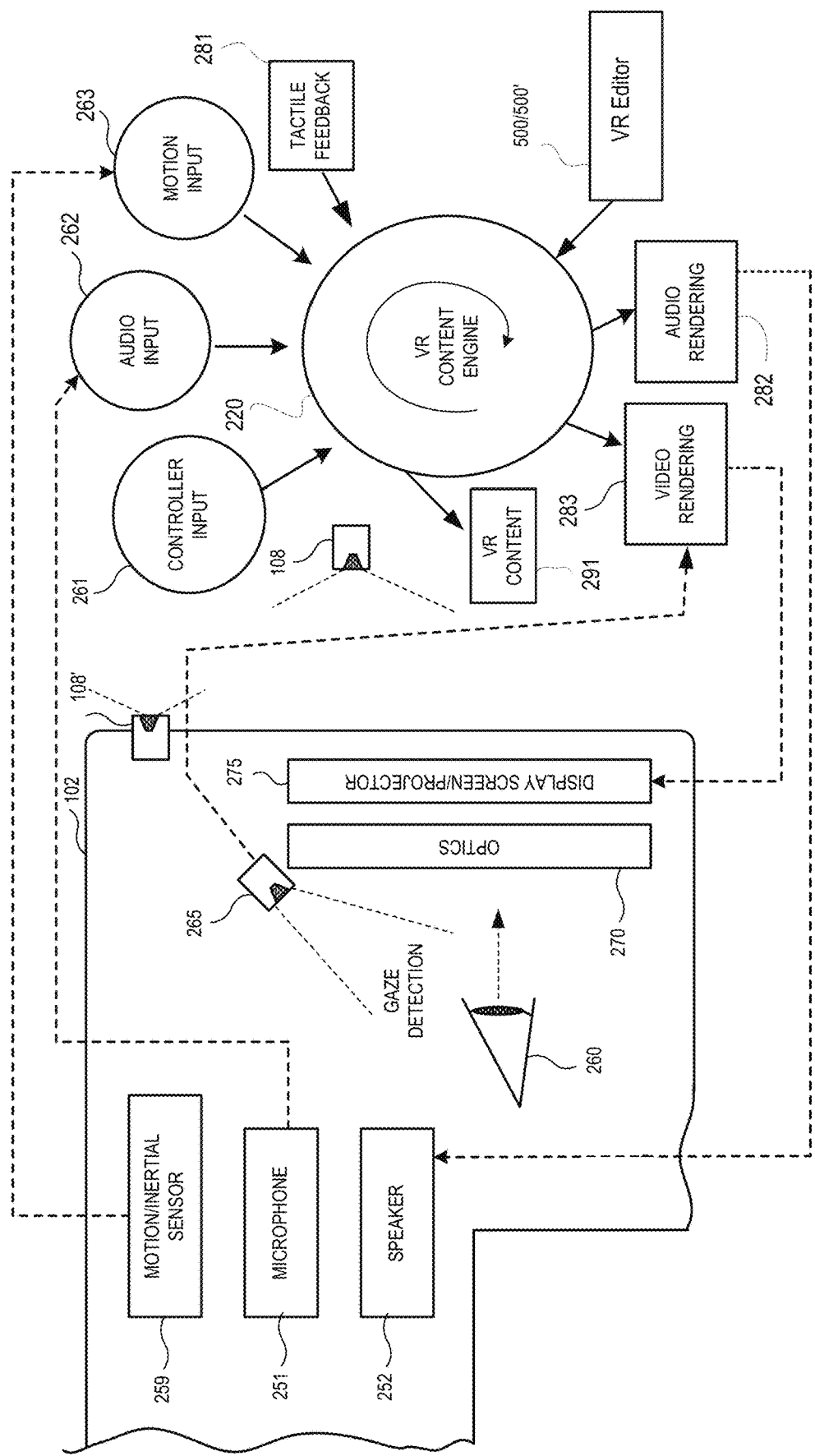
FIG. 2 conceptually illustrates the function of a HMD in conjunction with executing video game and for providing a 3D editing space for editing of 3D digital content, in accordance with an embodiment of the invention.

FIG. 2 conceptually illustrates the function of a HMD 102 in conjunction with the generation of VR content 291 (e.g., execution of an application and/or video game, etc.), to include providing a 3D editing space for editing 3D digital content, in accordance with an embodiment of the invention. In some implementations, the VR content engine 220 is being executed on a computer 106 (not shown) that is communicatively coupled to the HMD 102. The computer may be local to the HMD (e.g., part of local area network) or may be remotely located (e.g., part of a wide area network, a cloud network, etc.) and accessed via a network. The communication between the HMD 102 and the computer 106 may follow a wired or a wireless connection protocol. For example, the VR content engine 220 may support a VR editor 500/500' that is configured for providing a 3D editing space for editing 3D digital content, such as 3D gaming environments of gaming applications, 3D videos, etc. In another example, the VR content engine 220 executing an application may be a video game engine executing a video game, and is configured to receive inputs to update a game state of the video game. The following description of FIG. 2 is described within the context of the VR content engine 220 executing a video game, for purposes of brevity and clarity, and is intended to represent the execution of any application capable of generating VR content 291, such as for purposes of providing a 3D editing space for editing of 3D digital content. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the VR content engine 220 receives, by way of example, controller input 261, audio input 262 and motion input 263. The controller input 261 may be defined from the operation of a gaming controller separate from the HMD 102, such as a hand-held gaming controller 104 (e.g. Sony DUALSHOCK®4 wireless controller, Sony PlayStation®Move motion controller) or wearable controllers, such as wearable glove interface controller, etc. By way of example, controller input 261 may include directional inputs, button presses, trigger activation, movements, gestures or other kinds of inputs processed from the operation of a gaming controller. The audio input 262 can be processed from a microphone 251 of the HMD 102, or from a microphone included in the image capture device 208 or elsewhere within the local system environment. The motion input 263 can be processed from a motion sensor 259 included in the HMD 102, or from image capture device 108 as it captures images of the HMD 102. For example, in the case of 3D editing in a 3D editing space the VR content engine 220 receives inputs which are processed according to user input corresponding to editing commands. In the case of executing a gaming application, the VR content engine 220 receives inputs which are processed according to the configuration of the content engine 220 operating as a game engine to update the game state of the video game. The engine 220 outputs game state data to various rendering modules which process the game state data to define content which will be presented to the user.

In the illustrated embodiment, a video rendering module 283 is defined to render a video stream for presentation on the HMD 102. VR editor 500 (or editor 500' that is local to the HMD 102) is configured to provide a 3D editing space for editing of 3 digital content, such as 3D gaming environments of gaming applications, 3D videos, etc. The 3D editing space is responsive to input commands delivered through controllers, recognition or tracking of objects (e.g., responsive to hand gestures), mouse, keyboard, motion controllers, audio commands, and other user interfaces. Components and/or functions of the VR editor 500 may be performed within a CPU or GPU, or combination thereof.

A lens of optics 270 in the HMD 102 is configured for viewing the VR content 291. A display screen 275 is disposed behind the lens of optics 270, such that the lens of optics 270 is between the display screen 275 and an eye 260 of the user, when the HMD 102 is worn by the user. In that manner, the video stream may be presented by the display screen/projector mechanism 275, and viewed through optics 270 by the eye 260 of the user. An HMD user may elect to interact with the interactive VR content 291 (e.g., VR video source, video game content, etc.) by wearing the HMD for purposes of editing 3D digital content in the 3D editing space, for example. Interactive virtual reality (VR) scenes from a video game may be rendered on the display screen 275 of the HMD. In that manner, during game development the HMD 102 allows the user to edit and review the interactive VR scenes. Also, during game play (to include reviewing edits) the HMD allows the user to completely immerse in the game play by provisioning display mechanism of the HMD in close proximity to the user's eyes. The display regions defined in the display screen of the HMD for rendering content may occupy large portions or even the entirety of the field of view of the user. Typically, each eye is supported by an associated lens of optics 270 which is viewing one or more display screens.

An audio rendering module 282 is configured to render an audio stream for listening by the user. In one embodiment, the audio stream is output through a speaker 152 associated with the HMD 102. It should be appreciated that speaker 152 may take the form of an open air speaker, headphones, or any other kind of speaker capable of presenting audio.

In one embodiment, a gaze tracking camera 265 is included in the HMD 102 to enable tracking of the gaze of the user. Although only one gaze tracking camera 265 is included, it should be noted that more than one gaze tracking camera may be employed to track the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized (e.g., showing peripheral editing windows, etc.). It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 265, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 281 is configured to provide signals to tactile feedback hardware included in either the HMD 102 or another device operated by the HMD user, such as a controller 104. The tactile feedback may take the form of various kinds of tactile sensations, such as vibration feedback, temperature feedback, pressure feedback, etc.

Figure 3A:
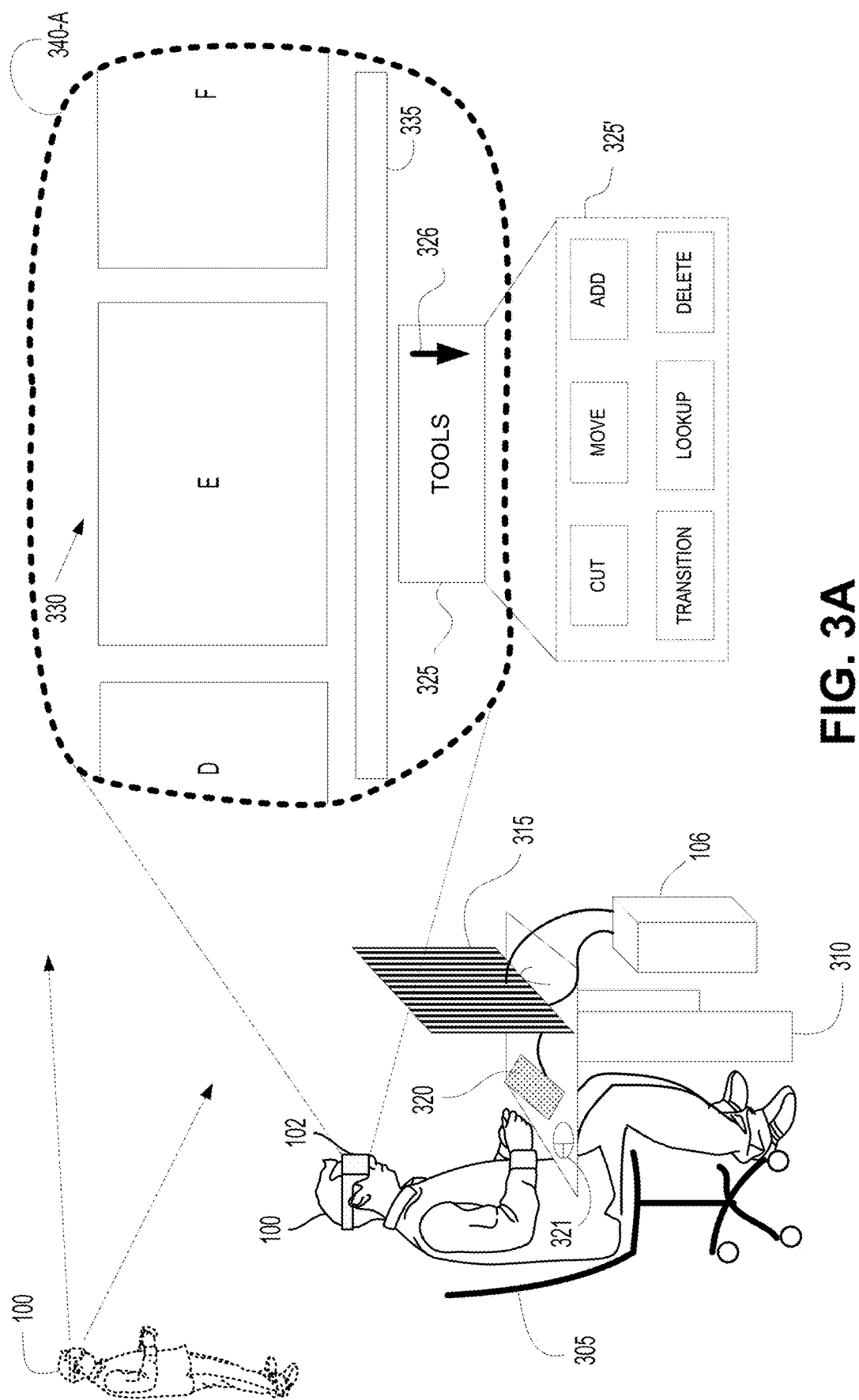
FIG. 3A is an illustration of a user interacting with a 3D editing space via an HMD for purposes of editing of 3D digital content, in accordance with one embodiment of the present disclosure.

FIG. 3A is an illustration of a user 100 interacting with a 3D editing space 340 via an HMD 102 for purposes of editing of 3D digital content, in accordance with one embodiment of the present disclosure. For example, user 100 is sitting at a workstation 310 in a chair 305 that includes a computer 106 configured for providing the 3D editing space 340 for editing of 3D digital content. A screen 315 is used to provide a visual interface of the VR editor 500 executing on the computer 106, wherein the interface of the VR editor 500 is responsive to controller inputs as provided through the mouse 321, keyboard 320, or other user interfaces. This visual interface can be used to display 2D images of the 3D digital content for purposes of editing, such as in the typical editing environment. However, in one embodiment, the user 100 wearing the HMD 102 is given a virtual view of the screen 315, as well as virtual views of the keyboard 320 and mouse 321 for purposes of editing the 3D digital content, as will be described below in relation to FIG. 3B.

In addition, the user 100 could be interacting with the 3D editing space 340 away from the workstation 106. As shown, user 100 could be standing and corresponding with the computer 106 for purposes of interacting with the 3D editing space 340 as viewed through the HMD 102. For example, as previously described in FIG. 1A-1C, user 100 could be providing editing commands through a controller 104 being held by the user 100, or through hand gestures, or through other user interfaces.

As shown, HMD 102 is showing an upper view 340-A into a VR editing space 340, wherein the upper view 340-A includes one or more of a sequence of interactive VR scenes 330 for purposes of editing. For purposes of illustration, the 3D digital content could be a sequence of interactive VR scenes 330, wherein each scene is part of a gaming environment of a gaming application. For example, upper view 340-A shows a part of the sequence of interactive VR scenes 330, including scenes D, E, and F. Each interactive VR scene could be one part of the gaming environment within which a player is able interact. The player may be controlling a character within the corresponding interactive VR scene, wherein the character may interact with objects in the scene, or change a view of the scene depending on the orientation of the user. The player may be controlling the character to achieve a goal within the context of the gaming application, or may be exploring the gaming environment within the context of the corresponding interactive VR scene (e.g., exploring an open world gaming application).

A timebar 335 is shown under the sequence of interactive VR scenes 330, wherein the timebar could indicate approximately which scenes in the sequence are currently being viewed. In other embodiments, the timebar 335 could also include the entire sequence of interactive VR scenes 330 and/or views into sub-scenes of each interactive VR scene.

A tools icon 325 is shown in the upper view 340-A. Drop down actuator 326 when selected by the user 100 expands the tool section by providing the drop down interface 325' for the tools. The drop down interface 325' includes one or more editing commands that are selectable by the user, such as cut, move, add, transition, lookup, delete, etc. The editing commands may be directed to a selected interactive VR scene, or sub-scenes of an interactive VR scene, for examples. In that manner, the user 100 is able to interact with the VR editing space without using user interfaces (e.g., mouse 321, keyboard 320, etc.) typically associated with the workstation 310. Of course, user 100 could interact with the VR editing space using those user interfaces associated with the workstation 310, in other implementations.

Figure 3B:
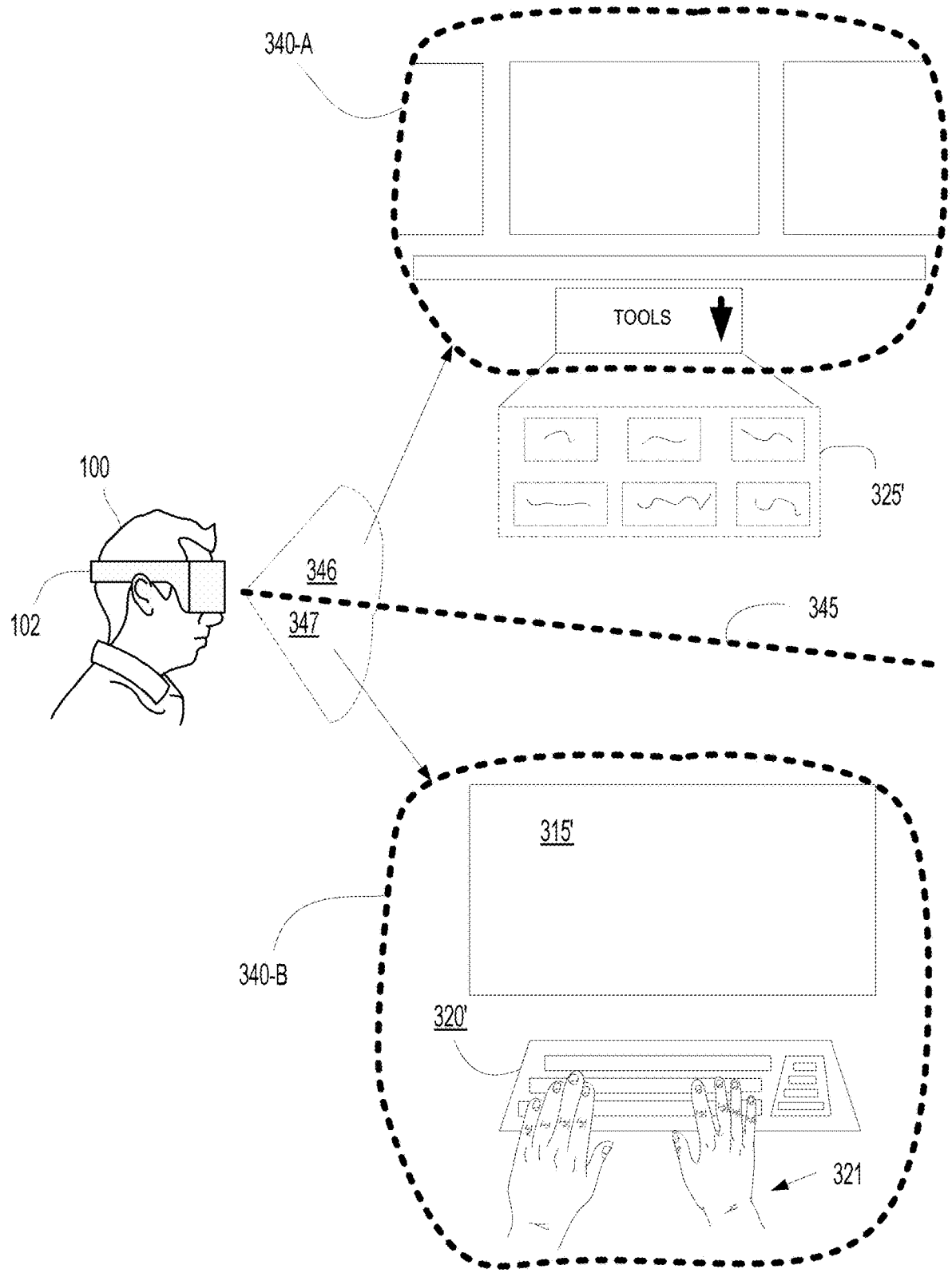
FIG. 3B is an illustration of a user viewing different portions of the 3D editing space of FIG. 3A depending on whether the HMD of the user is pointed towards the upwards or downwards direction, in accordance with one embodiment of the present disclosure.

FIG. 3B is an illustration of a user 100 viewing different portions of the 3D editing space 340 of FIG. 3A depending on whether the HMD 102 of the user is pointed towards the upwards or downwards direction, in accordance with one embodiment of the present disclosure. As shown, user 100 is wearing HMD 102 which is configured to show the 3D editing space 340, wherein the user 100 interacts with the 3D editing space to make edits to 3D digital content (e.g., a sequence of interactive VR scenes, etc.). The head of the user 100 is held at an angle, which may indicate which portion of the 3D editing space is desired for interaction by the user 100. A threshold angle 345 is shown by a dotted line. For example, the threshold angle may be approximately 40 degrees, wherein at 45 degrees, the head of the user is directed horizontally (e.g., parallel to the floor upon which the user stands).

The angle of the head of the user 100, and correspondingly the orientation of the HMD 102, may be detected, such as using camera 108, or magnetic sources and sensors, or through inertial sensors in the HMD 102. The HMD 102 is pointed upwards (e.g., into upper angles 346) when it is detected that the HMD 102 is orientated in a direction that is at or above the threshold angle 345. Conversely, the HMD 102 is pointed into a downwards (e.g., into lower angles 347) when it is detected that the HMD 102 is orientated in a direction that is at or below the threshold angle 345.

For example, when the HMD 102 is oriented upwards (e.g., above threshold angle 345), this triggers a view shown in the HMD of the upper portion 340-A of the 3D editing space 340. The upper portion 340-A was previously introduced in FIG. 3A, and includes pertinent portions of digital content (e.g., a portion of the sequence of interactive VR scenes including scenes D-E-F), and possibly some interactive editing tools for interaction by the user 100, as previously described. Each of the interactive VR scenes is shown in the upper portion 340-A in 3D, to provide an accurate view of the digital content as experienced by an end viewer—in the final published product, for example. As shown, upper portion 340-A may include the drop down interface 325' which includes editing tools, such as cut, move, add, transition, lookup, delete, etc. Selection and interaction with the editing tools by the user 100 may occur using user interfaces (e.g., controller 104, hand gestures, etc.). As shown, these user interfaces are typically independent of any workstation environment to provide ease of use for user 100. Before showing the upper portion 340-A, the user may be queried to provide an active response indicating a desire to view the upper portion 340-A.

Alternatively, when the HMD 102 is oriented downwards (e.g., below threshold handle 345), this triggers a view shown in the HMD of the lower portion 340-A of the 3D editing space 340. By looking downwards, the user 100 may indicate a desire to virtually view the workstation 310. That is, the lower portion 340-A of the 3D editing space 340 may show a virtual view of workstation 310 to include a virtual screen 315', virtual keyboard 320', and virtual hands 321. Virtual screen 315' may show 2D views of the digital content for editing (e.g., sequence of interactive VR scenes), as is typically provided in historic editing engines. For example, the 2D views may be butterfly views of scenes of a gaming environment or 3D video, which are edited in 2D, and converted after editing to 3D for viewing. Virtual screen 315' may show 2D views of interactive VR scenes including scenes D-E-F, or one of those scenes.

Third party or proprietary editing applications may be used as executed on computer 106 and shown on display 315 or virtual display 315'. These editing applications are used for creating VR content, both in an interactive VR world gaming environment, and for immersive viewing of a real-world environment. In some cases, an interface of a corresponding editing application is presented on the display in 2D, so that the editor is working with a flat rectilinear image, for instance. The editor is able to generally understand how the 2D images presented in the interface should look in the 3D world, at least for purposes of content generation. However, conversion to a 3D viewing environment is necessary to determine if the modifications to the digital content are presentable with the 3D world. In embodiments of the present disclosure, the third party or proprietary editing application is viewable within the 3D editing space, as shown in FIG. 3B.

For example, 360 immersive video of a real-world environment (e.g., event, city, etc.) can be generated by taking multiple images simultaneously from a specific viewpoint, and then stitching the images together to provide a 360 degree image and/or video. The 360 panoramic may be generated from images taken at a specific moment in time. A 360 degree video stream may be generated from images/video taken over a period of time. The 360 degree video stream may be edited using third party or proprietary editing applications of embodiments of the present disclosure. For illustration, portions of videos may be moved around in a sequence of videos, transitions added, portions of videos deleted, portions of videos added, etc. In another example, a VR world or gaming environment may also be generated and/or edited through third party or proprietary applications. That is, scenes, blocks, frames, used for creating the VR world are generated and/or populated, and then edited using the Third party or proprietary editing applications within the 3D editing space of the present disclosure.

The virtual views may represent the real interactions between the hands of the user 100 and the real keyboard 320 and screen 315. For example, the virtual views may be captured and/or generated by tracking those respective objects. Before showing the lower portion 340-B, the user 100 may be queried to provide an active response indicating a desire to view the upper portion 340-B.

Embodiments of the present disclosure provide a better editing environment the user 100. Before embodiments of the invention, the user would edit in 2D the interactive VR scenes using a workstation (e.g., computer 106, screen 315, user interfaces) without using an HMD. To view the edits, the user would then enter a command to convert the 2D data to 3D, and then put on an HMD to view the edited content. If further changes and/or edits are necessary, the user 100 would have to go back to the workstation environment, possibly reconvert the data back to 2D, and make edits on screen 315 while the interactive VR scenes are displayed in 2D. Again, to view the edits, the user convert the 2D data to 3D, place the HMD 102 back on the head to view the additional edited content. This process is repeated throughout the editing process.

On the other hand, embodiments of the present disclosure eliminates the back and forth between putting on and taking off the HMD. The user 100 is able to work both within the 2D and 3D editing modes, or choose to work entirely in the 3D editing mode. For example, the user may edit the digital content by viewing the virtual workstation in the lower view 340-B of the editing space 340. That is, the user is able to make edits in 2D on the virtual screen 315'. The edits are performed while wearing the HMD, for example, at least one editing command is provided through an input enabled while wearing the HMD, and viewing the 3D editing space. The edits may also be viewed within the 3D editing space, such as by viewing the virtual screen 315 to view the edits to the digital content in 2D. In addition, the user 100 may choose to view the edits in 3D mode by looking upwards, as previously described. That is, the upper portion 340-A of the 3D editing space 340 is shown, and includes 3D views of the digital content, such as the sequence of interactive VR scenes. As such, instead of taking the HMD 102 on and off during the editing process, the user need only to orient the HMD 102 at the correct angle. Other triggers for switching between the 2D and the 3D mode may be provided. For example, a selectable icon may be used to switch between the modes. In that manner, real-time views of the digital content are provided in the HMD 102 to show modifications to the digital content (e.g., through editing of the digital content).

Figure 3C:
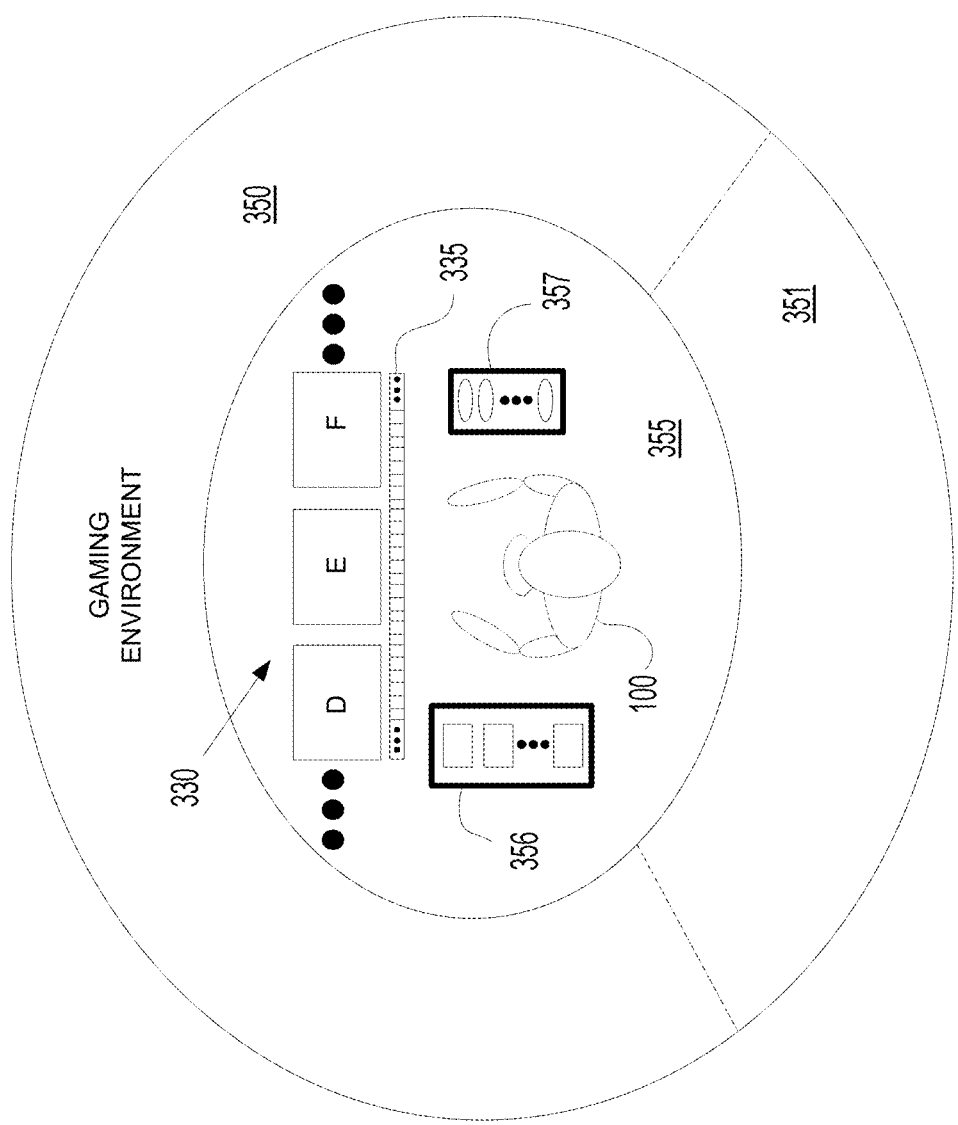
FIG. 3C is an illustration of the 3D editing environment of FIG. 3A configured for editing of 3D digital content by a user wearing an HMD, in accordance with one embodiment of the present disclosure.

FIG. 3C is an illustration of the 3D editing space 340 of FIG. 3A configured for editing of 3D digital content by a user 100 wearing an HMD 102, in accordance with one embodiment of the present disclosure. In particular, a virtual user 100 is provided in 3D editing space 340, wherein the virtual user 100 may be shown for purposes of interacting with the 3D editing space 340 (e.g., viewing, selecting, editing, etc.).

An inner region 355 of the 3D editing space 340 is used primarily for editing of digital content. The inner region 355 may include views of the upper portion 340-A of the 3D editing space 340 introduced in FIGS. 3A-3B, and/or views of the lower portion 340-B introduced in FIG. 3B. For example, when the upper portion 340-A is selected, the inner region 355 may include the digital content, such as the sequence of interactive VR scenes 330 and the timebar 335. In addition, the inner region 355 may include a tools interface 357, which may be analogous to tools 325. Further, the inner region 355 may include may include a pool of new digital content (e.g., interactive VR scenes) for selection (e.g., insertion, etc.). The user need only to orient the HMD 102 in a direction pointing to these interfaces, for purposes of interaction. Other user interfaces may also be implemented, for editing purposes. As shown, virtual user 100 is able to view and interact with the information shown in the inner region 355 for purposes of editing the digital content.

In addition, inner region 355 of the 3D editing space may include a view of the lower portion 340-B, as previously described. In that case, when the lower portion 340-B is selected, the inner region may include one or more components of the workstation 310. For example, the user 100 is able to interact with virtual components of the workstation to provide editing of the digital content in 2D mode. In one implementation, inner region 355 includes a view of the virtual screen 315' and virtual keyboard 321', virtual mouse, and other virtual user interfaces.

An outer region 350 of the 3D editing space 340 is also shown. The outer region 350 may include a 3D view into the digital content, wherein the digital content may include a gaming environment 331, or 3D video scenes, or video frames, etc. For example, the outer region 350 may be shown as a background of the inner region 355. As such, as the user makes edits, the results of the edits may appear immediately within the digital content shown in the outer region 350. In other implementations, the outer region 350 is selected by orientation of the HMD 102 (e.g., at or above a threshold angle 345), as previously described in FIG. 3B.

In addition, in some implementations, the outer region 350 includes a back region 351 that may be dark (e.g., blank, black, etc.) to save processing power. That is, because the user may not primarily engage with the back region 351, no rendering of data is provided in the back region. In other implementations, the back region 351 is fully enabled with rendered data.

Figure 3D:
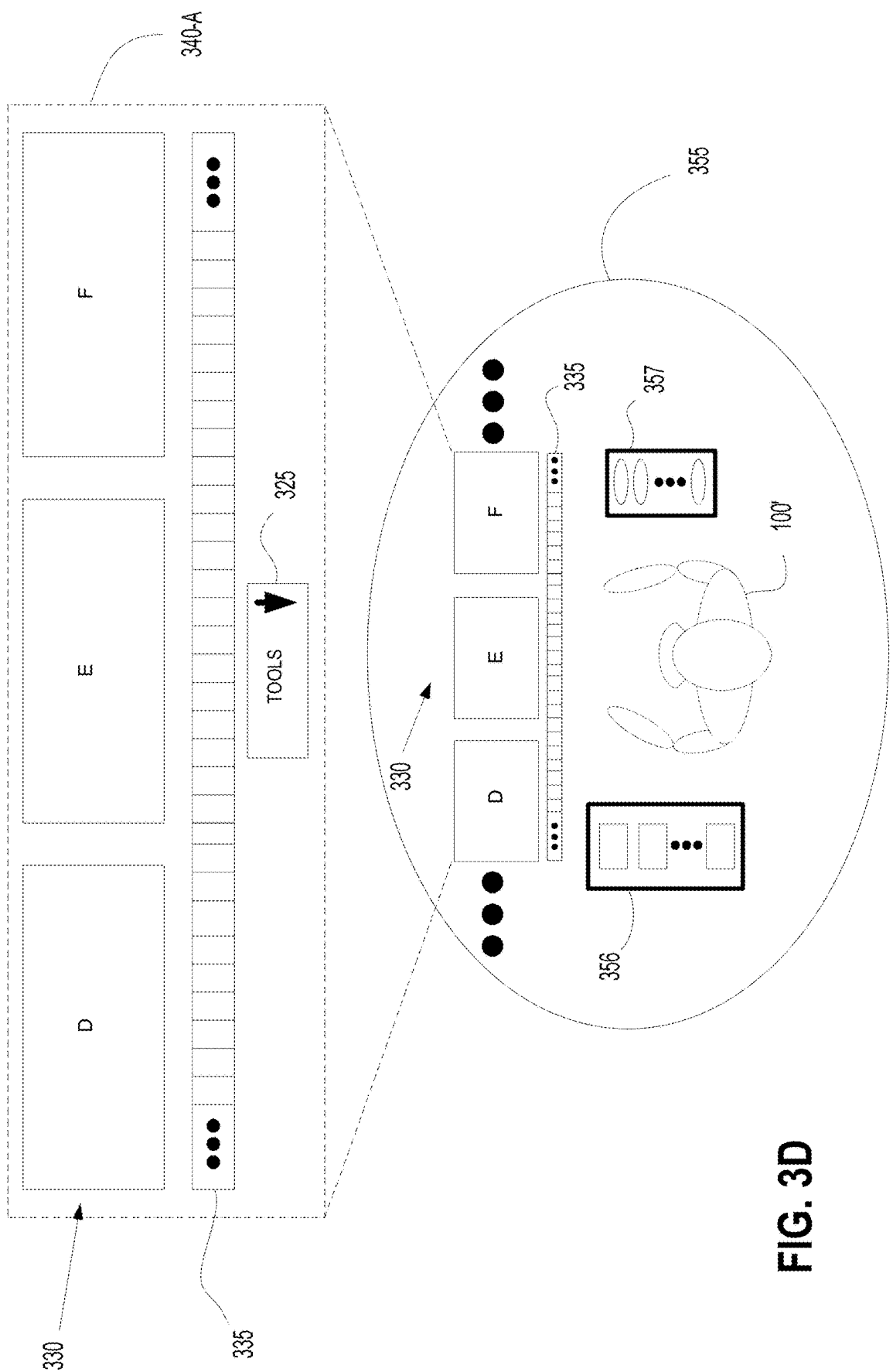
FIG. 3D is an illustration of a viewpoint of the user viewing one or more interactive VR scenes of a sequence of interactive VR scenes of 3D digital content within the 3D editing space of FIG. 3A as viewed through an HMD for editing of 3D digital content, in accordance with one embodiment of the present disclosure.

FIG. 3D is an illustration of an viewpoint of the user 100 viewing one or more interactive VR scenes of a sequence of interactive VR scenes 330 of 3D digital content within the 3D editing space 340 of FIG. 3A and FIG. 3C as viewed through an HMD for editing of 3D digital content, in accordance with one embodiment of the present disclosure. For example, the user 100 is working within the inner region 355 of the 3D editing space 340. Further, the user 100 is working within the upper portion 340-A of the 3D editing space 340, to include a view of interactive VR scenes D-E-F, timebar 335, and tools interface 325 for access. As such, the HMD 102 of the user 100 displays the upper portion 340-A of the 3D editing space 340, for purposes of interaction with the digital content for purposes of editing.

Figure 3E:
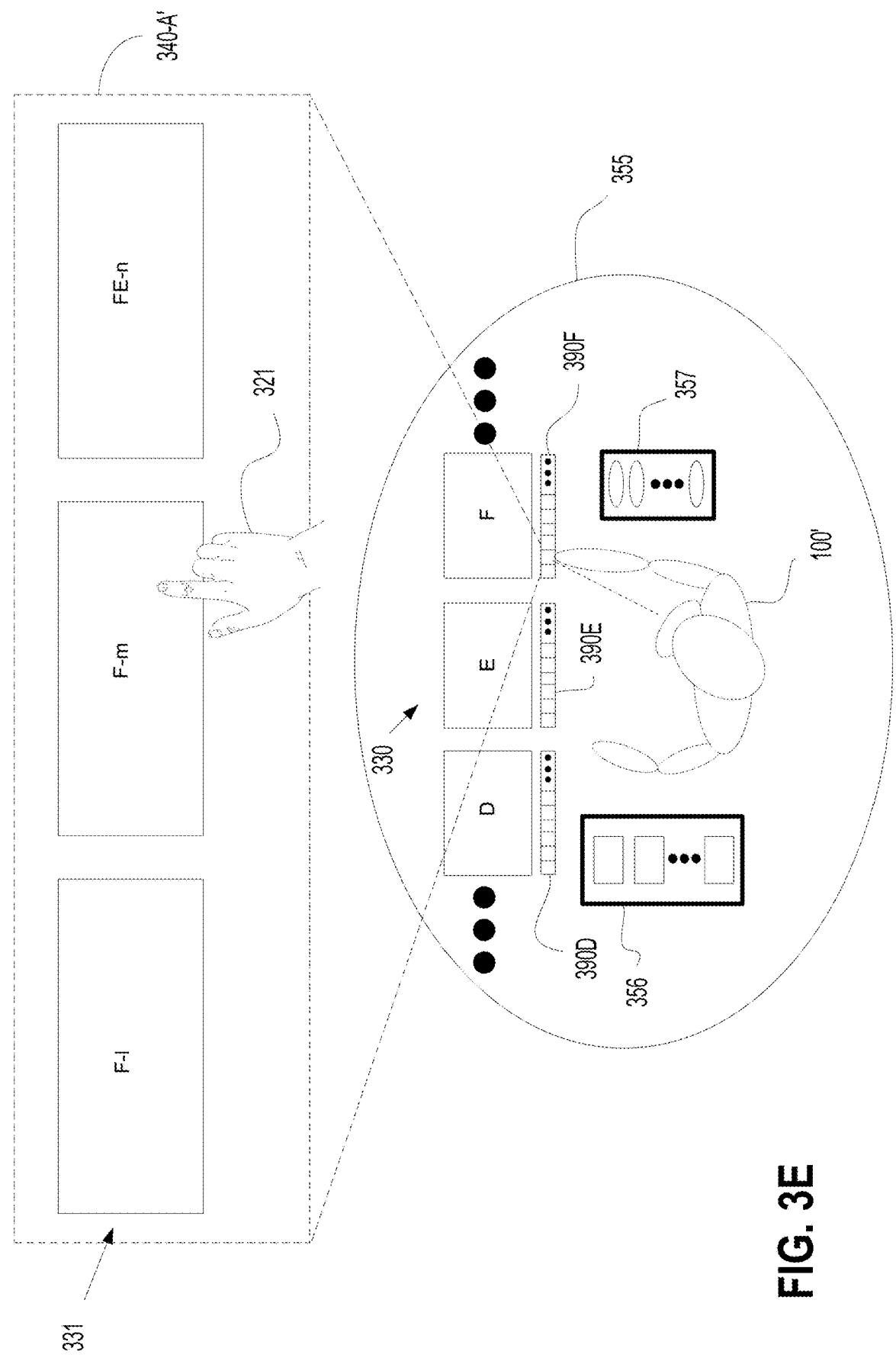
FIG. 3E is an illustration of a viewpoint of the user viewing one or more digital sub-scenes of a sequence of interactive VR scenes of digital content within the 3D editing space of FIG. 3A as viewed through an HMD for editing of 3D digital content, in accordance with one embodiment of the present disclosure.

FIG. 3E is an illustration of a viewpoint of the user 100 viewing one or more digital sub-scenes of a sequence of interactive VR scenes 330 of digital content within the 3D editing space 330 of FIG. 3A and FIG. 3D as viewed through an HMD 102 for editing of 3D digital content, in accordance with one embodiment of the present disclosure. In particular, the user is working within the upper portion 340-A of the inner region 355 of the 3D editing space 340, to include a view of interactive VR scenes D-E-F. Further, each of the interactive VR scenes may be partitioned into sub-scenes, in one embodiment. For example, interactive VR scene D is partitioned into one or more sub-scenes, as represented by bar 390D, which may also include a timebar, and VR scene E is partitioned into one or more sub-scenes, as represented by bar 390E. Also, VR scene F is portioned into one or more sub-scenes, as represented by bar 390F.

Further, user 100 has selected interactive scene F for expansion, as is shown through selection of the scene via hand gesture. For example, a new expanded view of upper portion 340-A' is shown, and includes one or more sub-scenes (e.g., F-1, F-m, F-n . . . ) of interactive VR scene F. Virtual hand 321 of user is shown selecting sub-scene F-M for purposes of editing within the 3D editing space 340.

Figure 4A:
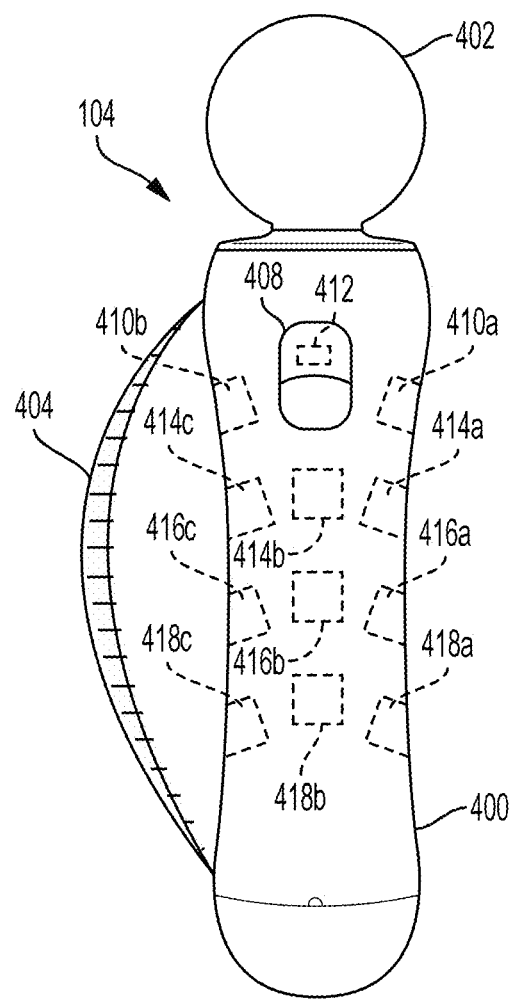
FIG. 4A illustrates a side view of a controller device used for providing input commands for editing of 3D digital content in a 3D editing space, in accordance with one embodiment of the present disclosure.

For purposes of illustration, FIG. 4A illustrates a view of a representative controller device 104, in accordance with implementations of the disclosure. One or more input commands may be detected through the use of the controller device 104, and/or through tracking of the controller device. Other means for providing input control is supported, such as those described in FIGS. 4B-4C below (e.g., hand gestures). In the illustrated implementation, the controller device 104 is in the form of a handheld motion controller, though other forms are supported. For example, the controller device 104 may include any of various other types of input devices, such as a joystick, touchpad, directional pad, etc. As shown, the controller device 104 includes a housing 400 that is configured to be gripped/held by a user's hand. The controller device 104 further includes an illuminated object 402 that is illuminated during use, to facilitate image-based tracking of the controller device 104. That is, captured images of the local interactive environment, for example captured by the camera 108, are analyzed to determine and track the location of the illuminated object, and thereby facilitate tracking of the controller device 104.

To secure controller device 104 to the user's hand and prevent accidental dropping of the controller device 104, the controller device 104 further includes a hand strap 404 that is configured to wrap around the palm of the user's hand, thereby maintaining the controller device 104 in contact with the user's palm even when the user's hand is completely open (fingers extended). In addition, the controller device 104 may also include a wrist strap (not shown) configured to secure the controller device 104 to the user's wrist. The controller device 104 further includes a trigger 408, that is configured to be operated by the index finger of the user's hand, when holding the controller device 104.

In order to detect the postures of the fingers of the user's hand, the controller device 104 includes a plurality of proximity sensors that are configured to detect the presence or absence of portions of the user's fingers in proximity to the proximity sensors, and/or distances to the portions of the user's fingers, when the user is holding/operating/using the controller device 104. These include proximity sensors 410a, 510b, 412, 414a-c, 416a-c, and 418a-c.

The various proximity sensors may detect the presence/absence/distance of different portions of the user's fingers depending upon which hand is holding the controller device 104 and the size of the user's hand. Broadly speaking for an average size hand, when the controller device 104 as shown is held by the user's right hand, then the proximity sensor 410a is configured to detect the proximity of the right thumb, whereas the proximity sensors 410b and 412 are configured to detect the proximity of portions of the right index finger. It will be appreciated that the proximity sensor 412 is integrated with the trigger 408, thereby providing both trigger functionality and proximity sensing simultaneously. Continuing with reference to the controller device 104 being held by the right hand of the user, then the proximity sensors 414a, 414b, and 414c are configured to detect the proximity of various portions of the user's right middle finger; the proximity sensors 416a, 416b, and 416c are configured to detect the proximity of various portions of the user's right ring finger; and the proximity sensors 418a, 418b, and 418c are configured to detect the proximity of various portions of the user's right pinky finger. It will be appreciated that the postures of the fingers of the user's hand can be determined or inferred based on the sensed input from the proximity sensors. For example, the sensed input from the proximity sensors can be processed to determine the amount of flexion or extension of the various fingers of the user's hand.

Furthermore, it will be appreciated that while the foregoing has been described with reference to the controller device 104 being held by the right hand of the user, the controller device 104 may also be operated by the left hand of the user, in which case the sensed input from the various proximity sensors will indicate postures of the fingers of the user's left hand.

Figure 4C:
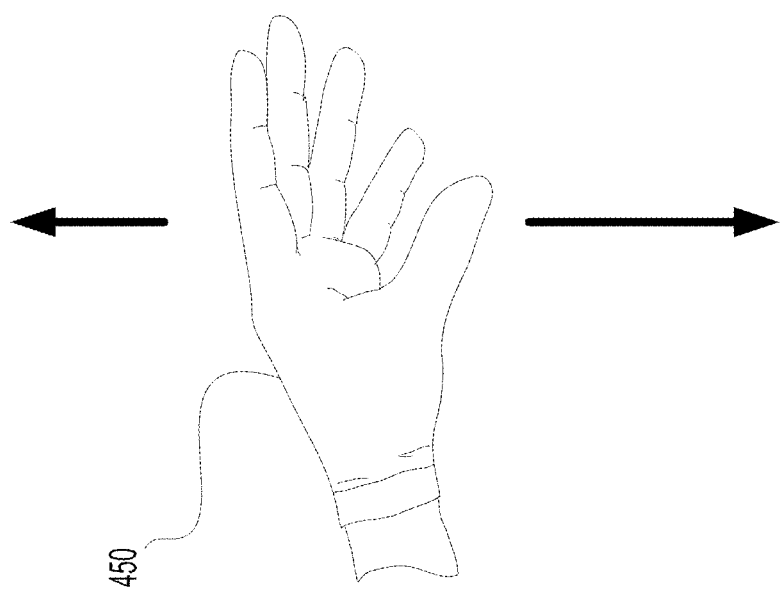
FIGS. 4B-4C illustrates hand gestures for providing input commands for editing of 3D digital content in a 3D editing space, in accordance with one embodiment of the present disclosure.
Figure 4B:
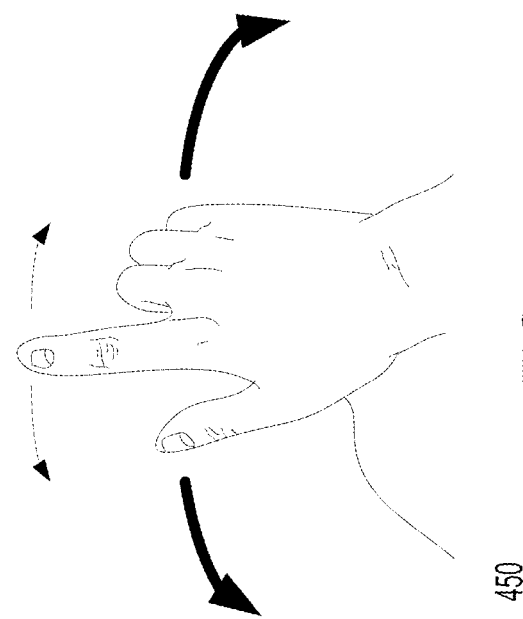

FIGS. 4B-4C illustrates hand gestures for providing input commands for editing of 3D digital content in a 3D editing space, in accordance with one embodiment of the present disclosure. For example, camera 108 may be used to track the motion of a hand 450 of user 100. In addition, a magnetic source 116, and magnetic sensors located on or near the hand 450 may be used to track the motion of the hand 450. Still other means for detecting and tracking hand, body, or object motion is supported for purposes of providing editing commands. In particular, FIG. 4B shows the horizontal motion of the hand 450 sweeping right-to-left in one motion, or left-to-right in one motion, or repeated back and forth motions right-to-left and back left-to-right. For example, this may provide an input command to move to a different location within a sequence of interactive VR scenes. A motion to the left may indicate movement of the sequence of interactive VR scenes to the left, and conversely a motion to the right may indicate movement of the sequence to the right.

In addition, FIG. 4C shows the vertical motion of the hand 450 sweeping from down-to-up in one motion, or from up-to-down in one motion, or repeated up and down motions. For example, this may provide an input command to move to a different location within a sequence of interactive VR scenes that is displayed in part in vertical fashion (e.g., helical shape). A motion up may indicate movement of the entire sequence of interactive VR scenes upwards, and a motion downwards may indicate movement of t entire sequence downwards.

Figure 5:
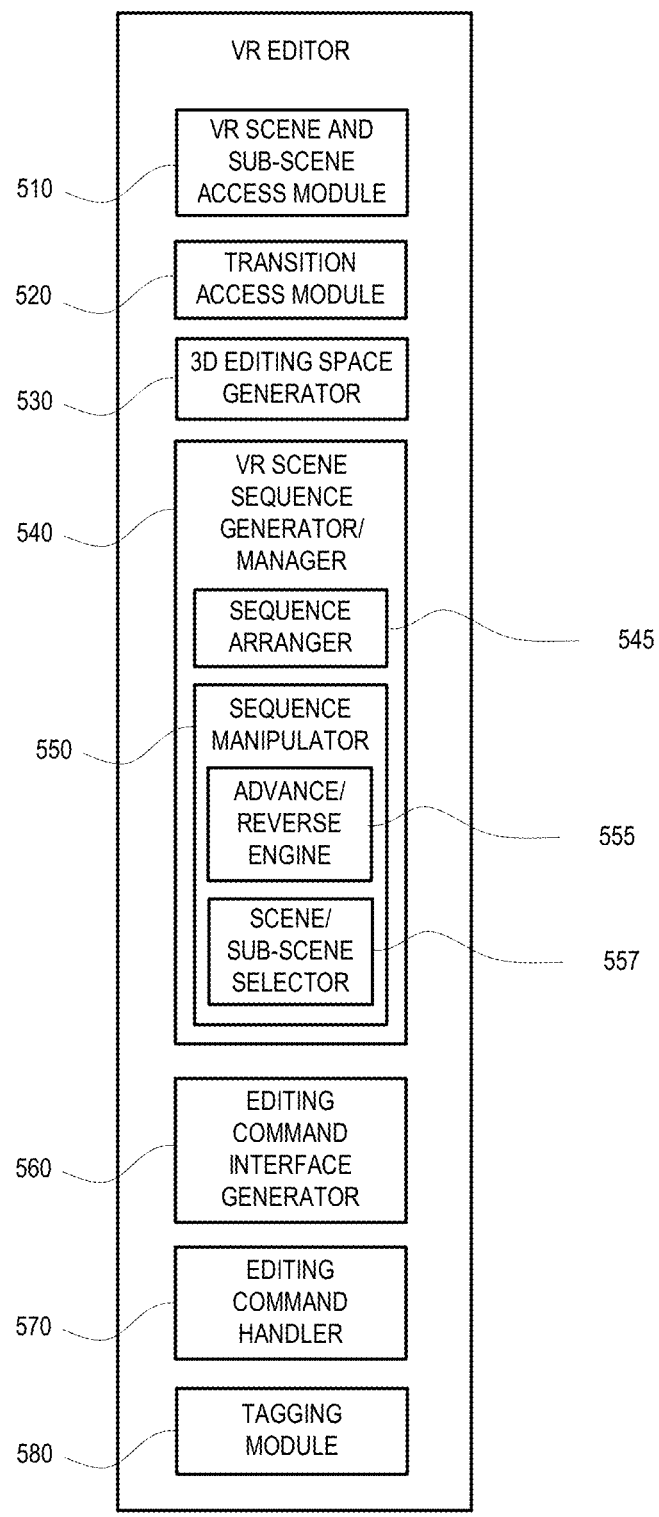
FIG. 5 illustrates functional components of a VR editor configured for editing of 3D digital content in a 3D editing space, wherein the VR editor may be implemented in software, hardware, or a combination of both, in accordance with one embodiment of the present disclosure.

FIG. 5 illustrates functional components of a VR editor 500 configured for editing of 3D digital content in a 3D editing space, wherein the VR editor 500 may be implemented in software, hardware, or a combination of both, in accordance with one embodiment of the present disclosure. In addition, the VR editor 500 may be configured locally within an HMD 102, or remote from the HMD, such as in computer 106 or even a back-end server. The VR editor 500 is configured to provide a 3D editing space for editing of 3D digital content (e.g., interactive VR scenes, 3D video, etc.).

In particular, VR editor 500 includes a VR scene and sub-scene access module 510, or digital content access module. The digital content (e.g., interactive VR scenes) may be stored in a data store locally or in a remote location. As previously described, the interactive VR scenes may define a gaming environment of a gaming application, wherein editing of the VR scenes is necessary during game development. For example, the VR editor 500 may be included as part of a software development kit (SDK) used to develop games executable on a particular gaming engine. Each VR scene may also include one or more sub-scenes, which are also stored in and accessed from data store. The VR scenes and sub-scenes are accessed for purposes of editing.

VR editor 500 also includes a transition access module 520. One or more transitions may be available for use during the editing process. The transitions may be predefined 3D data that may, for example, be inserted between one or more VR scenes. In some instances, the transitions may be inserted between one or more sub-scenes. As an illustration, a first scene and a second scene may define different parts of a gaming environment. For example, the first scene may be associated with a first task/level of a gaming application, and the second scene may be associated with a second task/level. A transition may be used to provide demarcation between the two scenes. For instance, a transition may include a pre-canned video sequence that introduces the player to the second scene, or provides additional storylines to the gaming application before the user enters the second scene. These transitions may be predefined, and stored in a data-store for later access during the editing process.

VR editor 500 includes the 3D editing space generator 530 that is configured to create the inner region 355 and outer region 350 of the 3D editing space 340 of FIG. 3C for purposes of interaction by the user when editing digital content. For example, the editing space generator 530 may be configured to generate the view of the upper portion 340-A of the editing space 340, to include one or more scenes of a sequence of interactive VR scenes, tools, and various user interfaces (e.g., new scene access, tool interface). In that manner, the user is able to view edit digital content in a 3D mode, and to view results of those edits in a 3D environment.

In addition, editing space generator 530 may be configured to generate a view of the lower portion 340-B of the editing space, to include virtual components of a virtual workstation so that the user is able to edit digital content in a 2D mode (e.g., through a virtual screen showing a 2D representation of the editing application). The editing space generator 530 is able to provide virtual representations of real-world user interactions of corresponding workstation components, in one implementation. For instance, the virtual screen is a representation of the real screen in the workstation, and real-world interactions of a real keyboard are virtualized within the lower portion 340-B of the editing space. In another implementation, user interaction with a user interface (e.g., real mouse, keyboard, etc.) is not visible, but the results of those interactions may be virtualized onto the virtual screen.

VR editor 500 includes a VR sequence generator/manager 540 configured to generate views of the digital content that is provided within the 3D editing space. In particular, the digital content may include a sequence of one or more interactive VR scenes that make up a gaming environment of a gaming application, for example. The VR sequence generator/manager 540 is configured to arrange the scenes in a particular order and to track the order using the sequence arranger 545. In addition, the sequence manipulator 550 is configured to change the view of interactive VR scenes in the sequence as shown within the 3D editing space, responsive to editing input commands. In one implementation, the sequence manipulator 550 acts as a slave to the editing command handler 570, described below. For example, advance/reverse engine 555 is configured to advance forward to a different number of scenes within the sequence for viewing, or to retreat back to a different number of scenes, as viewed within the 3D editing space. In addition, scene/sub-scene selector 557 is configured to select an interactive VR scene or sub-scene responsive to user input (e.g., selection) for purposes of determining which scenes or sub-scenes are the target of any editing input commands.

VR editor 500 includes an editing command interface generator 560 configured for presenting and giving access to one or more editing input commands within an interface presented within the 3D editing space. For example, interface generator 560 may be configured to include the tools interface 325 and tools drop down interface 326', previously introduced in FIG. 3A for purposes of user selection and interaction. For example, the editing command interface generator 560 may generate input commands for cutting, moving, deleting, inserting, editing, etc. that perform editing actions on the digital content, such as interactive VR scenes and/or sub-scenes. In addition, VR editor 500 includes an editing command handler 570 configured for performing the editing actions provided through selection of a corresponding editing command. That is, once a corresponding command is selected, the handler 570 performs the appropriate editing action(s) on the digital content.

Further, VR editor 500 includes a tagging module 580 that is configured to provide tagging information for corresponding portions of the digital content. For example, one or more tags may be associated with a particular interactive VR scene or sub-scene. In addition, one or more tags may be associated with a particular 3D video scene or video frame in a sequence of video scenes, or sequence of video frames.

The tags may be generated by the user through active input (e.g., keyboard, audio, etc.), such as through a specific tagging interface. In other implementations, the tags may be generated through passive input, such as through audio eavesdropping of the user. In that case, user commentary provided when editing the digital content may be provided in the form of tags to corresponding scenes, sub-scenes, video scenes, video blocks, video frames, etc. This passive automatic tag generation may be responsive to any user cue or input that provide an indication to user interaction, reaction, descriptions, or opinions. For example, eye movement (e.g., to look at some object) may define a key point of interest (POI), and wherein a POI tag may be generated for that object. Further, in another example, the tags may be generated to indicate the user's reaction, gesture, look direction for a particular scene, or object within the scene. In still another example, the user/editor may be providing running commentary as the digital content is being edited. That commentary may be automatically included in corresponding scenes, sub-scenes, video scenes, video blocks, video frames in the form of tags.

Figure 6:
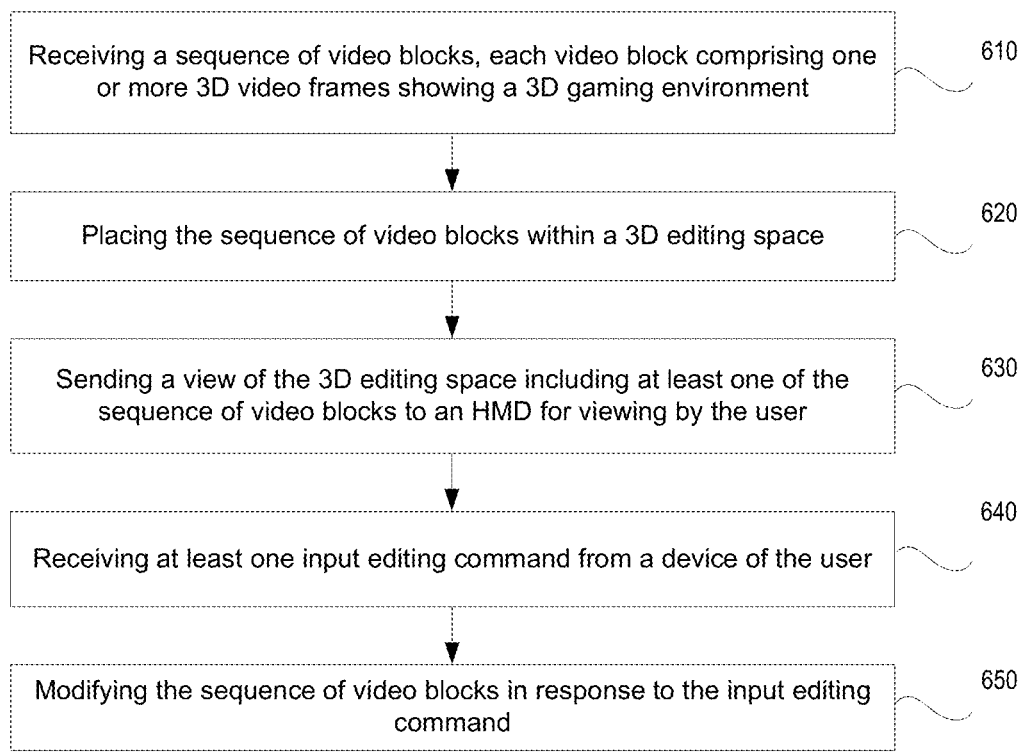
FIG. 6 is a flow diagram illustrating steps in a method for providing a 3D editing space for editing of 3D digital content, in accordance with one embodiment of the present disclosure.

With the detailed description of the various modules of the VR editor, flow diagram 600 of FIG. 6 discloses a method for providing a 3D editing space for editing 3D digital content, such as the arranging and rearranging of digital content, interactive VR scenes, sub-scenes, video scenes, video blocks, video frames, etc. The 3D editing space may be responsive to input commands delivered through user interfaces (e.g., controllers, motions controllers, hand gestures, etc.). The 3D editing space allows for real-time viewing and editing of the digital content, to include real-time viewing of the results of the editing process. For instance, the editor can make edits while wearing a HMD configured for stereoscopic or 3D viewing, and the results from the edits may be viewed in the 3D editing space without removing the HMD. Flow diagram 600 is implemented within a client device, HMD, or cloud based system when providing editing services, as previously described. In one implementation, the client device is a gaming console (also referred to as game console).

Though the method of flow diagram 600 is described within the context of manipulating and/or editing of interactive VR scenes, other embodiments, are well suited to the manipulation and/or editing of other digital content, including interactive VR sub-scenes, video scenes, video blocks, video frames, etc. That is, the method of flow diagram 600 is suitable for editing any form of digital content.

At 610, the method includes receiving a sequence of interactive VR scenes of digital content, each interactive VR scene showing a 3D environment. For example, the 3D environment may be an interactive gaming environment of a gaming application. In other implementations, the 3D environment may be a 3D world as shown through 3D video scenes, blocks, or frames. In both cases, the end user is able to interact with the 3D environment, such as through viewing the environment depending on a direction of gaze, or interaction with objects within the 3D environment, such as in a gaming environment.

At 620, the method includes placing the sequence of interactive VR scenes within a 3D editing space. The interactive VR scenes may be arranged in linear fashion, and presented within the 3D editing space in linear order. Other configurations are also supported. For example, the sequence of interactive VR scenes may be presented in helical form, as will be described in relation to FIGS. 8A-8D.

At 630, the method includes sending a view of the 3D editing space including at least one of the sequence of interactive VR scenes to an HMD for viewing by the user. Because one or more interactive VR scenes are viewable within the 3D editing space, interaction and manipulation of the scenes are enabled. For example, the user is able through employing a physical user interface (e.g., motion controller, controller, keyboard, mouse, etc.) to select and move the sequence of interactive VR scenes within the 3D editing space. In addition, through motion trackers, the user is able to convey input commands through hand or body gestures. In that manner, different scenes may be presented to the user within the 3D editing space as viewed through an HMD. The sequence may be manipulated to provide different scenes for viewing in the HMD.

Further, an expansion of the sequence of interactive VR scenes is possible for viewing within the 3D editing space. In one embodiment, each VR scene includes one or more sub-scenes. Through user selection, one or more sub-scenes of a selected VR scene may be provided within the 3D editing space. In particular, a selection of a first interactive VR scene is received, wherein the first VR scene includes one or more sub-scenes. As such, a first set of sub-scenes corresponding with the first VR scene is accessed (e.g., from a data store). In addition, the first set of sub-scenes is placed into the view of the 3D editing space for sending to the HMD. In that manner, the wearer of the HMD is able to perform editing on the set of sub-scenes.

At 640, the method includes receiving at least one input editing command from a device of the user. For example, the input editing command may be detected through user interaction with a user interface, including a controller, a motion controller, keyboard, mouse, gaze tracking, hand gestures, tracking of body parts or objects, microphone picking up audio commands, etc. In that manner, at 650 the method includes modifying the sequence of interactive VR scenes in response to the input editing command. In particular, at least one of the interactive VR scenes is modified in response to the at least one input editing command. In some implementations, if the 3D editing space is showing sub-scenes, then at least one of the sub-scenes is modified in response to at least one input editing command.

One or more editing commands are supported in embodiments of the disclosure. For example, the method includes grabbing a first interactive VR scene in the sequence of interactive VR scenes. Once the first interactive VR scene is selected, one or more editing commands may be performed on that VR scene. In one case, the first interactive VR scene is moved to another location in the sequence of interactive VR scenes. That is, the first interactive VR scene may be moved in a forwards direction towards the end of the sequence, or in a backwards direction towards the beginning of the sequence. In another case, the first interactive scene is deleted or removed from the sequence of interactive VR scenes.

In one embodiment, the sequence of interactive VR scenes is modified by adding new scenes. In particular, a first new interactive VR scene is accessed, selected, grabbed from an interface (e.g., window) in the 3D editing space. The new VR scenes are stored in a data store that is accessible by the VR editor, for example. The interface provides one or more of a plurality of new interactive VR scenes. As such, the user is able to select the first new interactive VR scene. Once selected, the new interactive VR scene is added to a selected location within the sequence of interactive VR scenes.

In another embodiment, the sequence of interactive VR scenes is modified by adding a transition between a first interactive VR scene and a second interactive VR scene. As previously described, the first VR scene and the second VR scene may define different portions of an interactive 3D environment, such as a gaming environment of a gaming application, or a 3D view of the real-world. For example, different scenes may be accessible through a scene portal used to access different parts of a game, e.g., different levels, or worlds, etc. When going from one interactive VR scene to another, or when entering an interactive VR scene, a transition may be inserted before that VR scene. The transition may provide introductory information for the interactive VR scene, or provide additional storylines to a gaming application, or may provide viewable content while the second interactive VR scene is being loaded.

Further, the method includes providing a 3D view into the 3D gaming environment within the 3D editing space to view the modifications made to the sequence of interactive VR scenes. In particular, at least one editing command used for editing digital content within the 3D editing space is provided through an input enabled while wearing the HMD. In addition, the 3D editing space is viewable within the HMD, such that real-time views of the digital content is provided within the HMD. In that manner, real-time views also show the modifications to the sequence of interactive VR scenes as they are being edited. For example, once an edit to the sequence of interactive VR scenes is received and performed, the result of that edit is immediately presented in an appropriate view within the HMD. For instance, the user may select to view the outer region of the 3D editing space to show the gaming environment as presented through the sequence of interactive VR scenes. In addition, the 3D editing space may be configurable to provide the tools for VR editing while viewing the gaming environment, though they may be subdued while in the viewing mode (and not the editing mode). Further, the 3D editing space may be configurable to only provide a view into the gaming environment. Additional user interaction will bring back the tools for VR editing, such as bringing the user back to within the inner region of the 3D editing space (e.g., the upper portion or the lower portion). As such, the editor is able to make edits to the sequence of interactive VR scenes while wearing the HMD, and then without taking the HMD off, view the modifications of the sequence of interactive VR scenes resulting from the editing process within the 3D editing space. The modifications may be viewed in 2D mode (e.g., viewing the lower portion of the 3D editing space showing s virtual screen of a workstation configured for VR editing). In addition, the modifications may be viewed in 3D mode (e.g., viewing the upper portion of the 3D editing space showing 3D views of the sequence of interactive VR scenes. Further, the modifications may be viewed fully in 3D, wherein the gaming environment is displayed fully within the HMD, to include the edits to the sequence of interactive VR scenes.

FIGS. 7A-7D show illustrative editing commands as performed on a sequence of interactive VR scenes 330 of 3D digital content as preformed within a 3D editing space. Other editing commands are supported in other embodiments. For example, the editing commands may be performed while wearing an HMD, and the modifications to the sequence of interactive VR scenes 330 as made through the editing process are viewable in real-time in the 3D editing space while still wearing the HMD. Though FIGS. 7A-7D are described within the context of manipulating and/or editing of interactive VR scenes, other embodiments, are well suited to the manipulation and/or editing of other digital content, including interactive VR sub-scenes, video scenes, video blocks, video frames, etc.

Figure 7A:
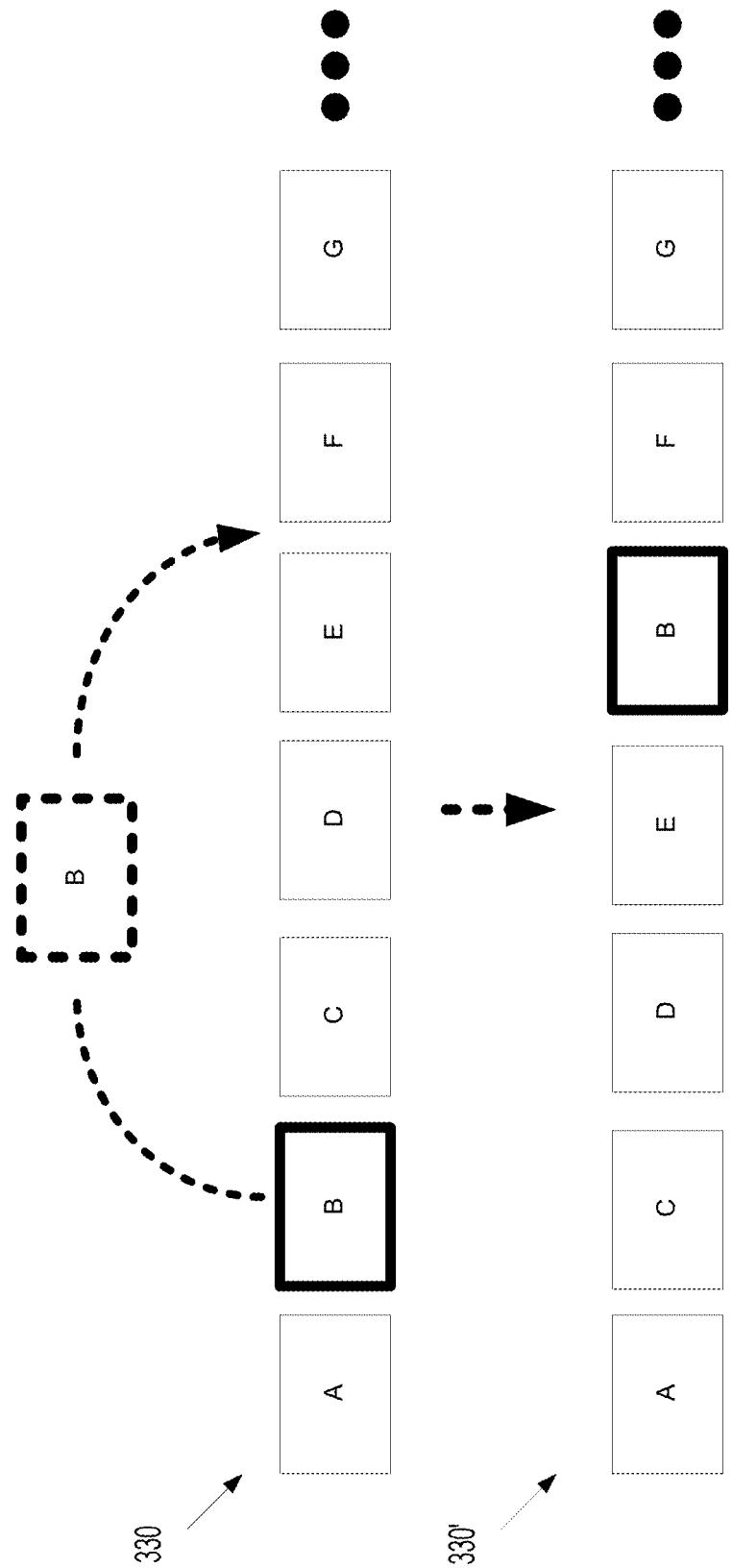
FIG. 7A illustrates the movement of an interactive VR scene from a first location to a second location in a sequence of interactive VR scenes of 3D digital content as performed within a 3D editing space, in accordance with one embodiment of the present disclosure.

In particular, FIG. 7A illustrates the movement of an interactive VR scene from a first location to a second location in a sequence of interactive VR scenes 330 of 3D digital content as performed within a 3D editing space, in accordance with one embodiment of the present disclosure. The sequence of interactive VR scenes 330 includes interactive VR scenes A-B-C-D-E-F-G, etc. A first interactive VR scene is selected, which is scene "B". As shown, VR scene "B" is moved to a different location within the sequence of interactive VR scenes 330, and more specifically to a location that is between VR scene "E" and VR scene "F". Specifically, FIG. 7A shows the modified sequence of interactive VR scenes 330' showing VR scene "B" between VR scenes "E" and "F".

Figure 7B:
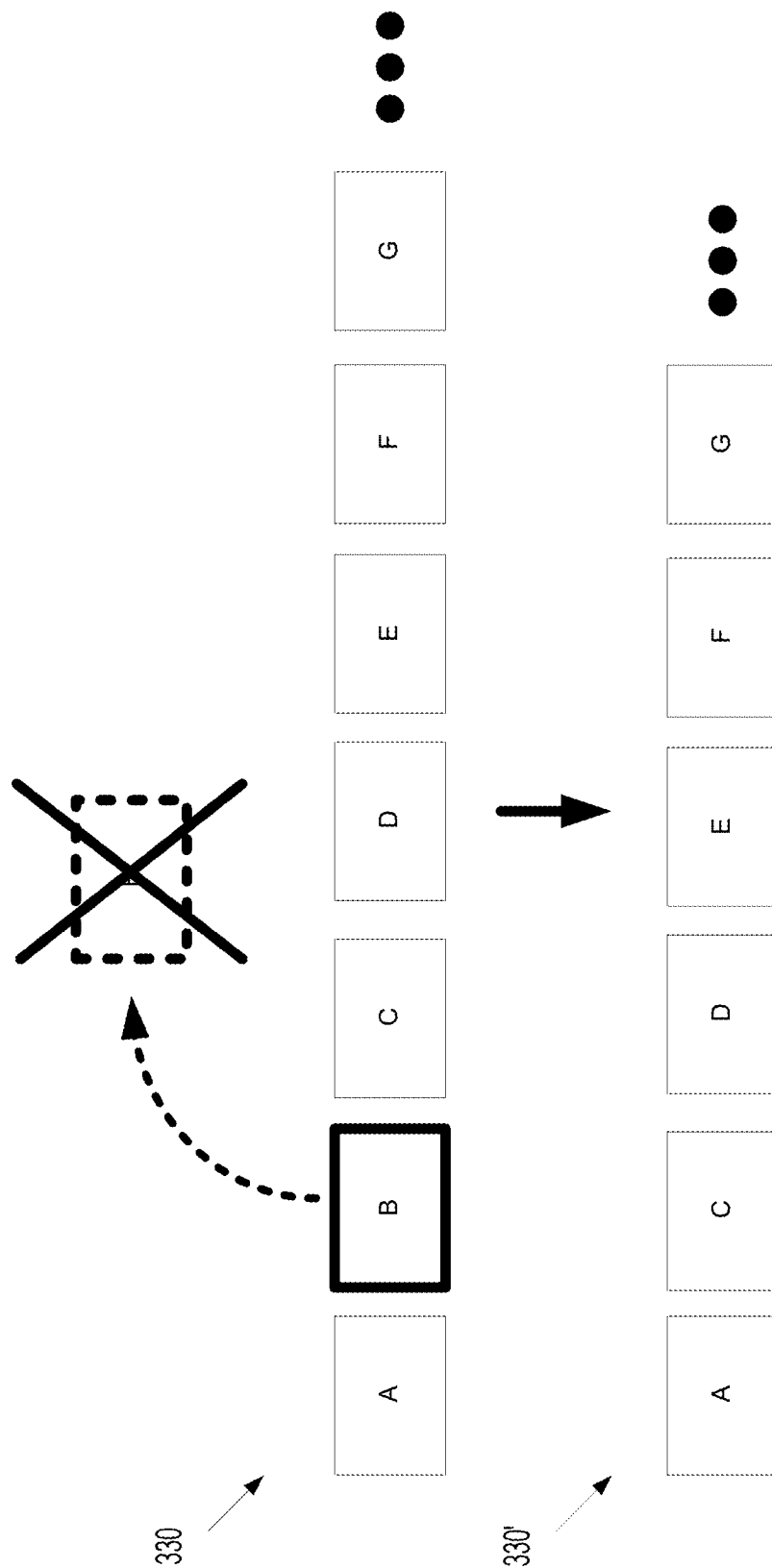
FIG. 7B illustrates the deletion of an interactive VR scene from a sequence of interactive VR scenes of 3D digital content as performed within a 3D editing space, in accordance with one embodiment of the present disclosure.

FIG. 7B illustrates the deletion of an interactive VR scene from the sequence of interactive VR scenes 330 of 3D digital content as performed within a 3D editing space, in accordance with one embodiment of the present disclosure. The sequence of interactive VR scenes 330 includes interactive VR scenes A-B-C-D-E-F-G, etc. A first interactive VR scene is selected, which is scene "B". As shown, VR scene "B" is deleted from the sequence of interactive VR scenes 330. Specifically, FIG. 7B shows the modified sequence of interactive VR scenes 330' showing the deletion of VR scene "B".

Figure 7C:
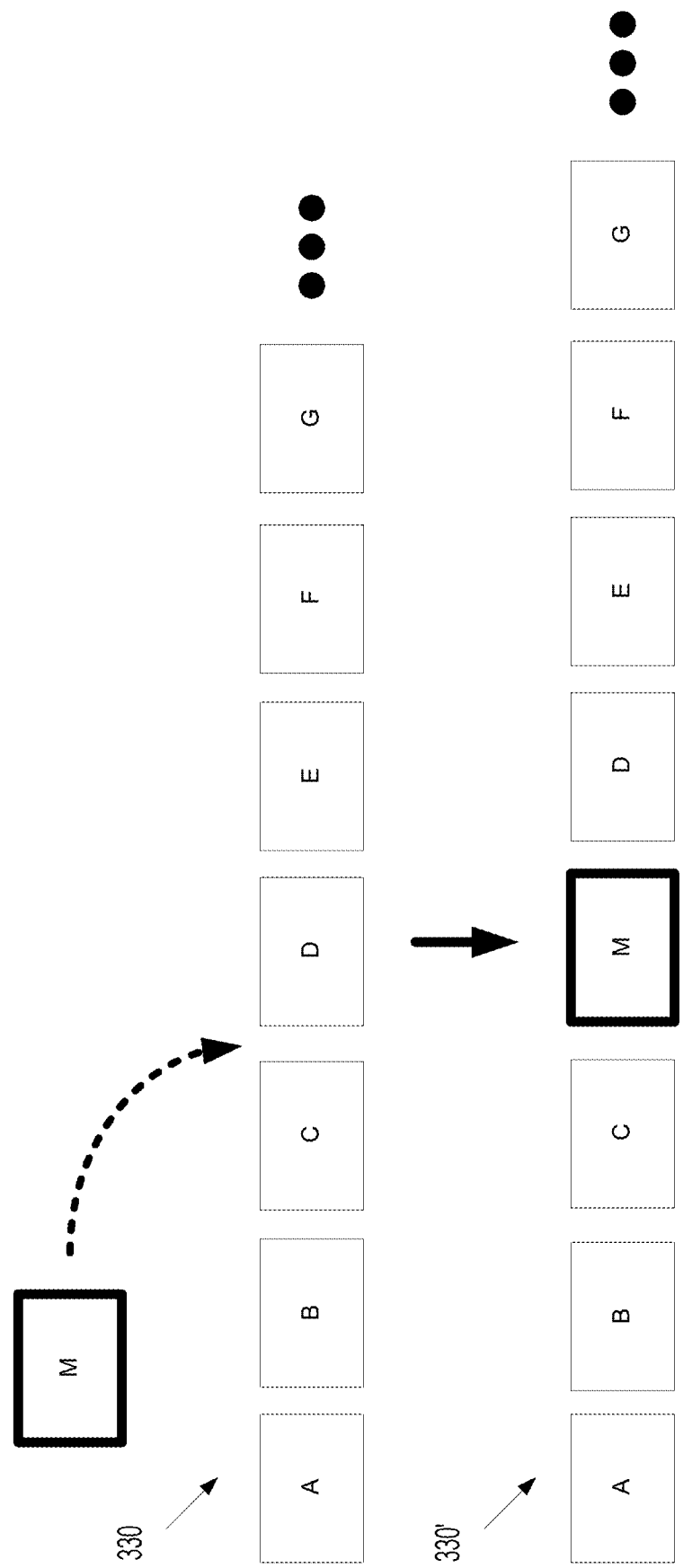
FIG. 7C illustrates the insertion of an interactive VR scene into a sequence of interactive VR scenes of 3D digital content as performed within a 3D editing space, in accordance with one embodiment of the present disclosure.

FIG. 7C illustrates the insertion of a new interactive VR scene into a sequence of interactive VR scenes of 3D digital content as performed within a 3D editing space, in accordance with one embodiment of the present disclosure. The sequence of interactive VR scenes 330 includes interactive VR scenes A-B-C-D-E-F-G, etc. A first interactive VR scene is selected, which is scene "M". The VR scene "M" is selected from a pool of new interactive VR scenes made available within the 3D editing space (e.g., within an interface including the new VR scenes for selection). Specifically, FIG. 7C shows the modified sequence of interactive VR scenes 330' showing the new interactive VR scene "M" between interactive VR scenes "C" and "D".

Figure 7D:
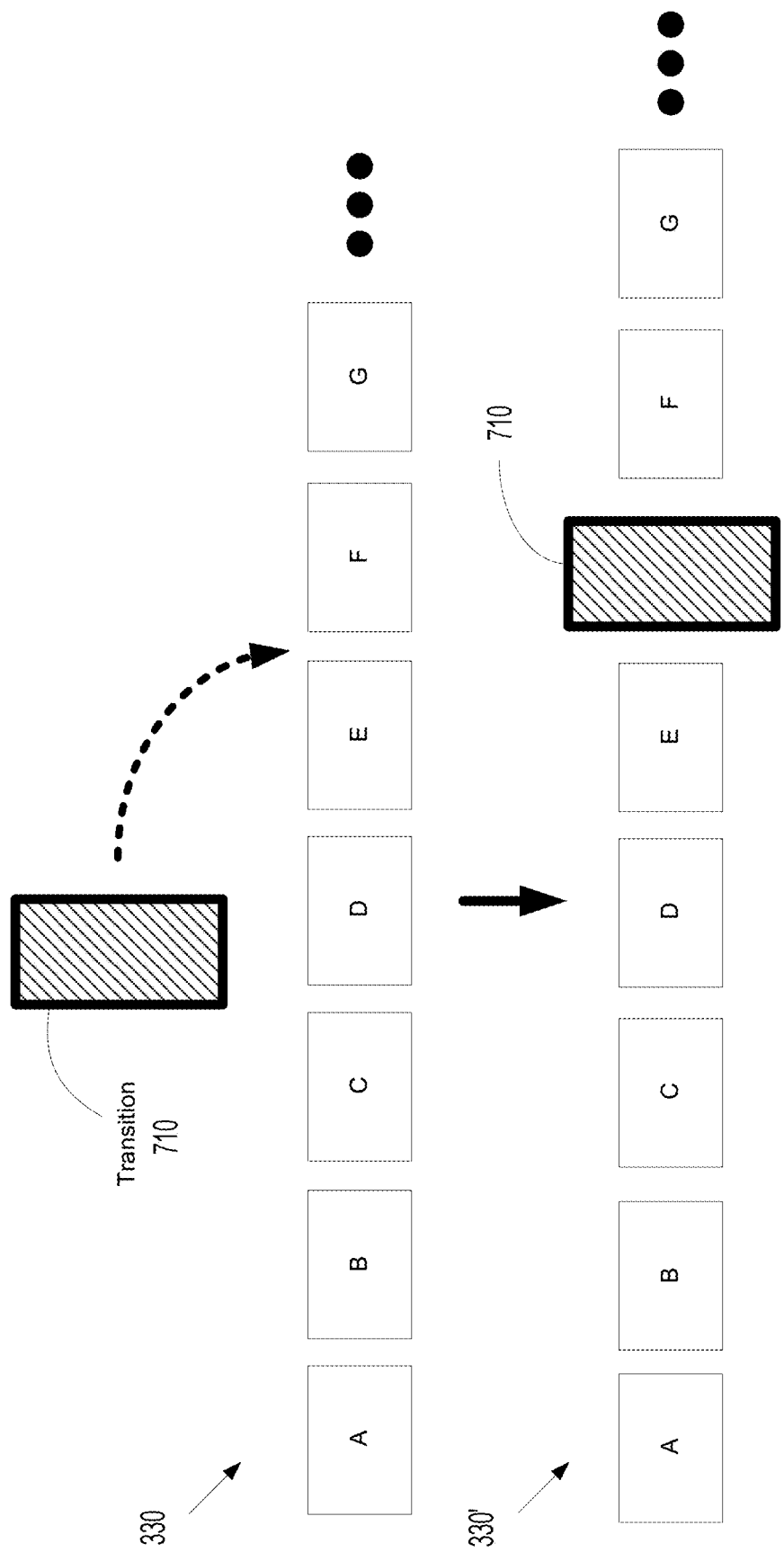
FIG. 7D illustrates the insertion of a transition into a sequence of interactive VR scenes of 3D digital content as performed within a 3D editing space, in accordance with one embodiment of the present disclosure.

FIG. 7D illustrates the insertion of a transition into a sequence of interactive VR scenes of 3D digital content as performed within a 3D editing space, in accordance with one embodiment of the present disclosure. The sequence of interactive VR scenes 330 includes interactive VR scenes A-B-C-D-E-F-G, etc. A first transition 710 is selected, and is selected from a pool of transitions made available within the 3D editing space (e.g., within an interface including the transitions for selection). Specifically, FIG. 7D shows the modified sequence of interactive VR scenes 330' showing the transition 710 between interactive VR scenes "E" and "F".

FIGS. 8A-8E illustrate a sequence of interactive VR scenes 330 of 3D digital content arranged in helical form within a 3D editing space for purposes of editing by a user. The 3D editing space and the edits performed by the user while wearing an HMD have been previously described in FIGS. 1-7.

Figure 8A:
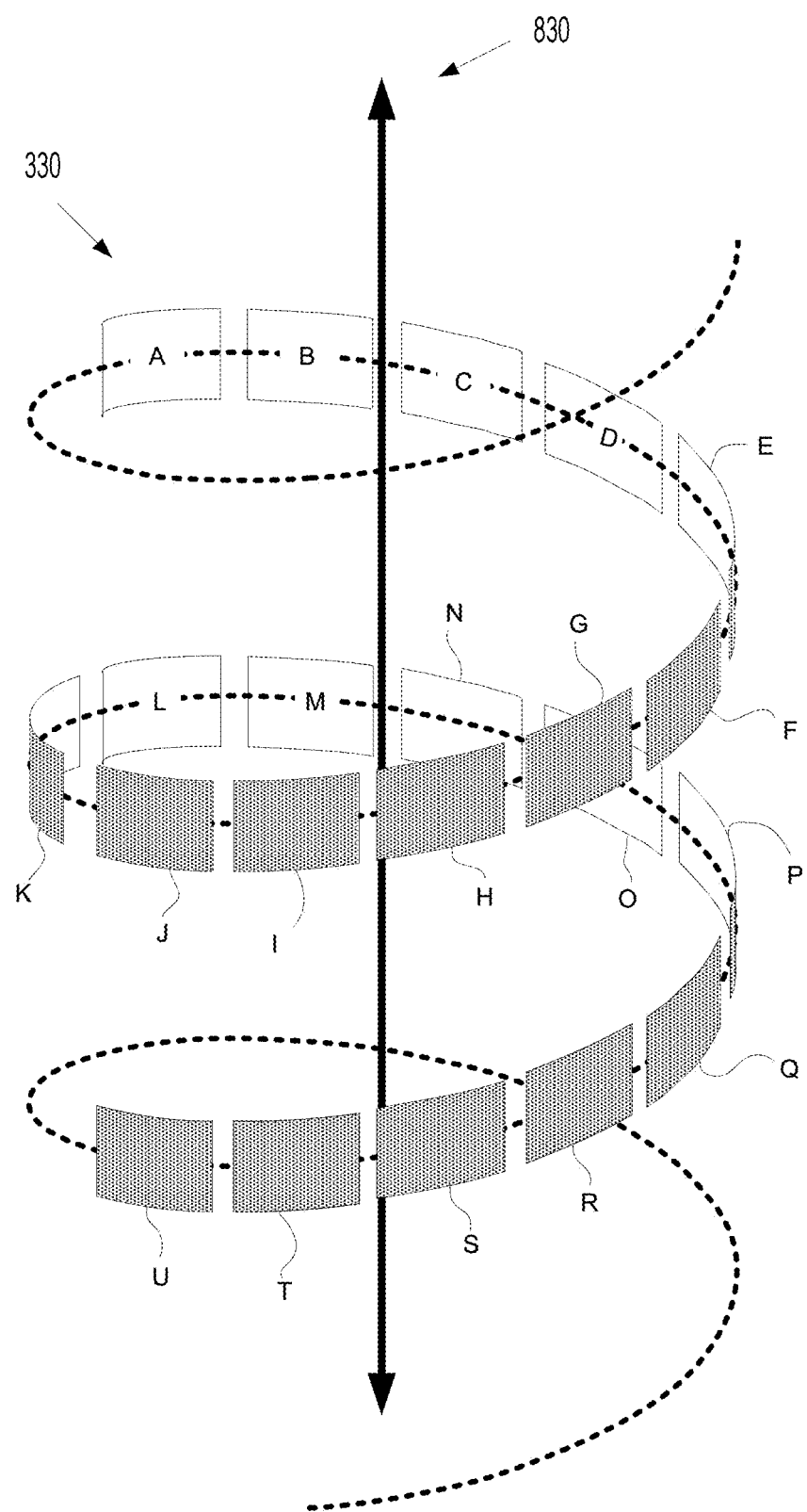
FIG. 8A illustrates a sequence of interactive VR scenes of 3D digital content arranged in a helical form within a 3D editing space, in accordance with one embodiment of the present disclosure.

In particular, FIG. 8A illustrates a sequence of interactive VR scenes 330 of 3D digital content arranged in a helical form within a 3D editing space, in accordance with one embodiment of the present disclosure. As shown, the sequence of interactive VR scenes 330 includes interactive VR scenes A-B-C-D-E-F-G, etc. The sequence of interactive VR scenes 330 is arranged in the form of a helix, and having at least a beginning VR scene (e.g., VR scene "A") and an end VR scene. The helix includes a central axis 830, wherein each of the interactive VR scenes face inwards towards the central axis 830.

Figure 8B:
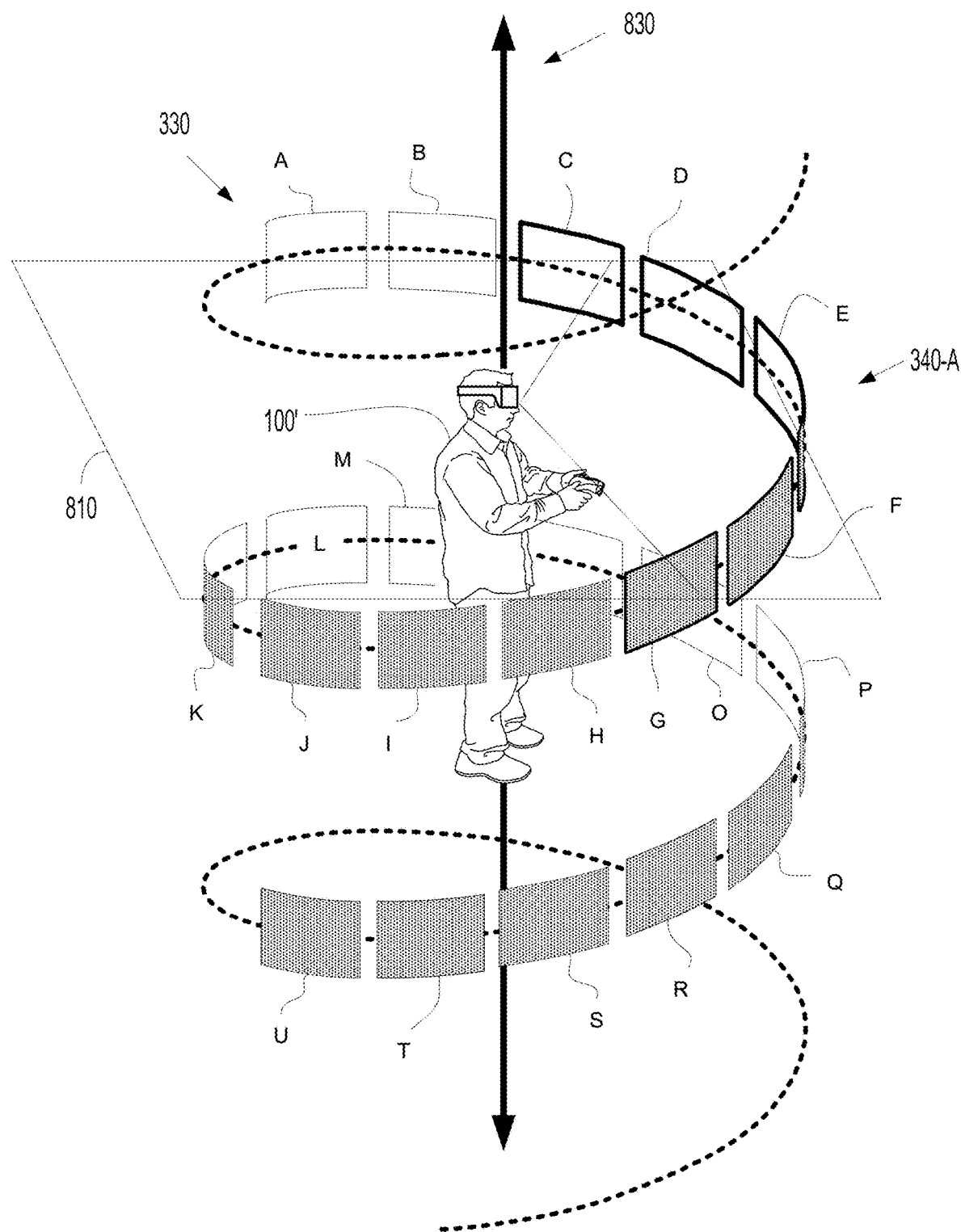
FIG. 8B illustrates a sequence of interactive VR scenes of 3D digital content arranged in helical form and a viewing plane of a virtual user within a 3D editing space, in accordance with one embodiment of the present disclosure.

FIG. 8B illustrates the sequence of interactive VR scenes 330 of 3D digital content arranged in helical form and a viewing plane 810 of a virtual user 100' within the 3D editing space, in accordance with one embodiment of the present disclosure. A 360 degree stereoscopic view of the sequence of interactive VR scenes 330 is generated from a point on the central axis 830. In particular, the virtual user 100' is placed within the helix on center axis 830. The sequence of interactive VR scenes 330 is arranged within the 3D editing space 340 such that the horizontal viewing plane 810 includes one or more interactive VR scenes, and in particular includes a focal interactive VR scene (e.g., VR scene E that is centered in the view of the user 100'). Specifically, the view of the user 100' as presented within an HMD includes the upper portion 340-A of the 3D editing space, as previously described in relation at least to FIGS. 3A-3B. In that manner, the upper portion 340-A of the 3D editing space includes interactive VR scenes D, E, and F within the horizontal viewing plane 810. The user 100' may view other parts of the sequence of interactive VR scenes 330 by changing the orientation of the HMD 102, but the main focal point of the sequence is within the horizontal plane 810, such as for purposes of editing the sequence of interactive VR scenes 330. That is, the 360 degree stereoscopic view is placed in the 3D editing space, such that the horizontal plane 810 intersects the focal interactive VR scene (e.g., scene E) in the sequence of interactive VR scenes 330.

Figure 8C:
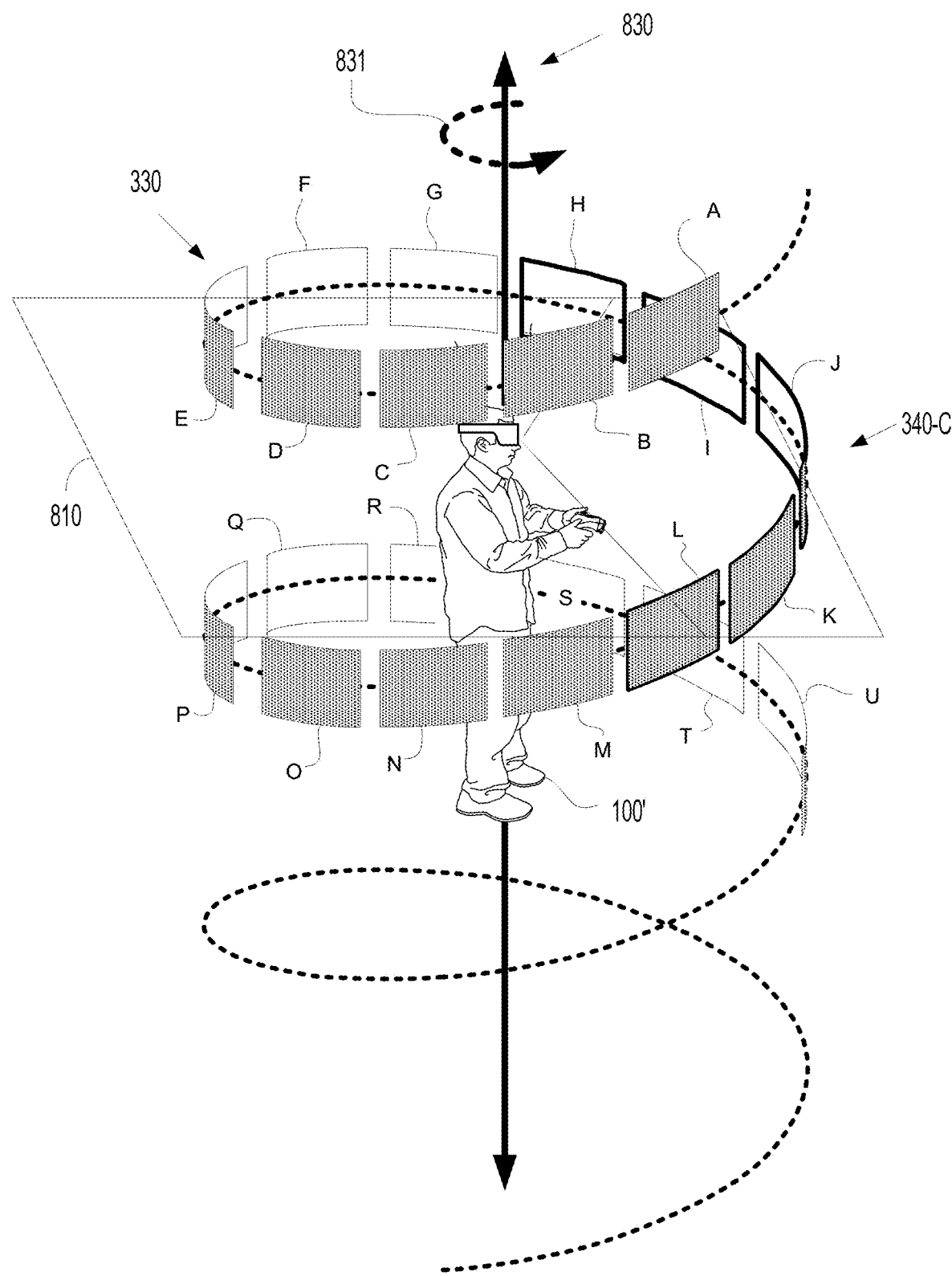
FIG. 8C illustrates the rotation of a sequence of interactive VR scenes of 3D digital content within a 3D editing space to provide a view of selected interactive VR scenes in the sequence, in accordance with one embodiment of the present disclosure.

FIG. 8C illustrates the rotation of the sequence of interactive VR scenes 330 of 3D digital content within the 3D editing space to provide a view of selected interactive VR scenes in the sequence, in accordance with one embodiment of the present disclosure. In particular, in response to a received viewing command from a device of the user 100' (e.g., a controller), the helix is rotated to change the focal interactive VR scene. The helix may be rotated in a clockwise or counter-clockwise direction and responsive to user input (e.g., hand gesture in the selected clockwise or counter-clockwise direction). As such, the sequence of interactive VR scenes 330 is rotated (e.g., counter-clockwise as shown by arrow 831), such that the horizontal plane 810 intersects a new focal interactive VR scene (e.g., scene J), wherein scenes I through K are shown in the modified upper portion 340-C of the 3D editing space.

Figure 8D:
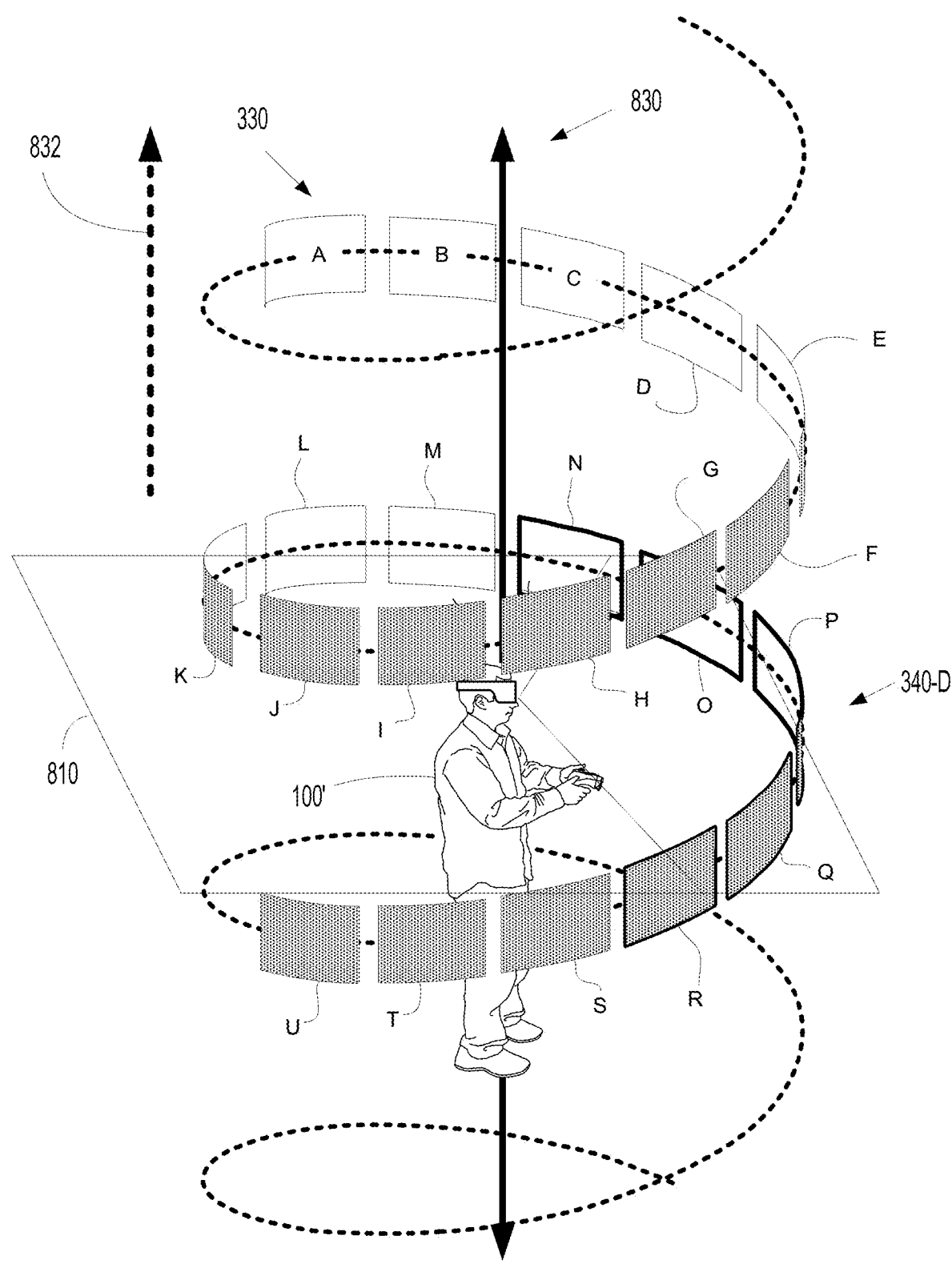
FIG. 8D illustrates the vertical movement of a sequence of interactive VR scenes of 3D digital content within a 3D editing space to provide a view of selected interactive VR scenes in the sequence, in accordance with one embodiment of the present disclosure.

FIG. 8D illustrates the vertical movement of a sequence of interactive VR scenes 330 of 3D digital content within a 3D editing space to provide a view of selected interactive VR scenes in the sequence, in accordance with one embodiment of the present disclosure. In particular, in response to a received viewing command from a device of the user 100' (e.g., a controller), the helix is vertically moved to change the focal interactive VR scene. The helix may be moved in an upwards vertical direction or a downwards vertical direction (e.g., hand gesture in the upwards or downwards direction), without any rotation of the helix. As such, the sequence of interactive VR scenes 330 is vertically moved (e.g., upwards as shown by arrow 832), such that the horizontal plane 810 intersects a new focal interactive VR scene (e.g., scene P), wherein scenes O through Q are shown in the modified upper portion 340-D of the 3D editing space.

Figure 8E:
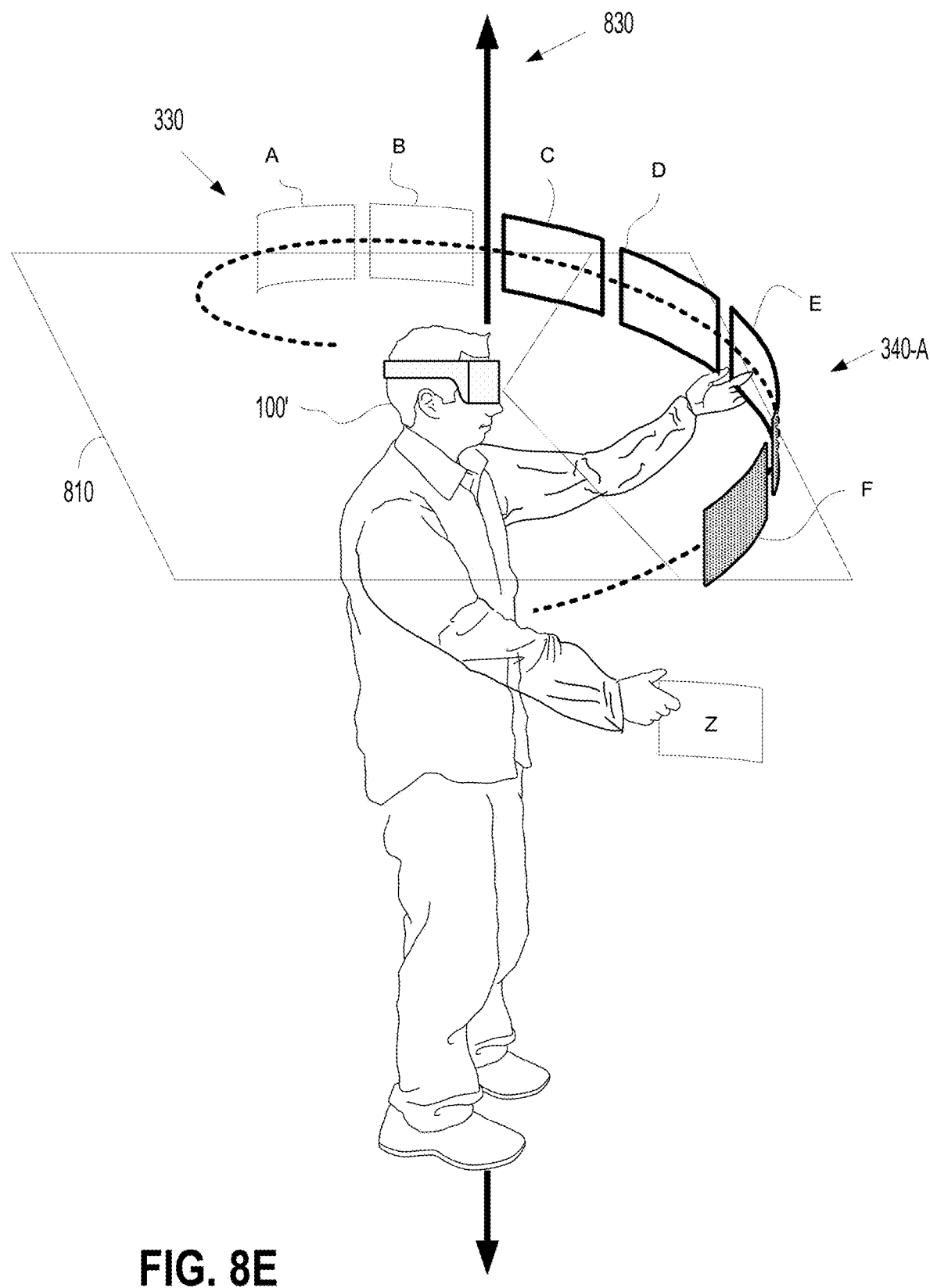
FIG. 8E illustrates the interaction of the virtual user, that is representing the physical user, and the digital content for purposes of editing, in accordance with one embodiment of the present disclosure.

FIG. 8E illustrates the interaction of the virtual user 100', that is representing the physical user 100, and the digital content for purposes of editing, in accordance with one embodiment of the present disclosure. For example, the movements and gestures of the physical user 100 can be tracked and represented through the virtual user 100', as shown in the 3D editing space shown in the HMD 102. For example, the left hand of the user 100' can be moved to grab VR scene E that is in horizontal plane 810. In that manner, scene E may be selected for further editing, such as moving, deleting, modifying, etc. For example, editing of scene E may be achieved through a drag-and-drop process, or other gestures indicating editing commands or movement of scene E. In addition, the right hand of the user 100' is shown grabbing a new scene Z, for purposes of editing the sequence of interactive VR scenes 330 of 3D digital content in the 3D editing space. For example, editing of scene Z may be achieved through a similar drag-and-drop process, or other gestures indicating editing commands or movement of scene Z, to indicate where scene Z should be placed within the sequence of interactive VR scenes 330, or any other performance of editing commands directed to scene Z. The editing of the sequence of interactive VR scenes 330 is intended to be intuitive to the user 100 and easy to use for the user 100.

Figure 9:
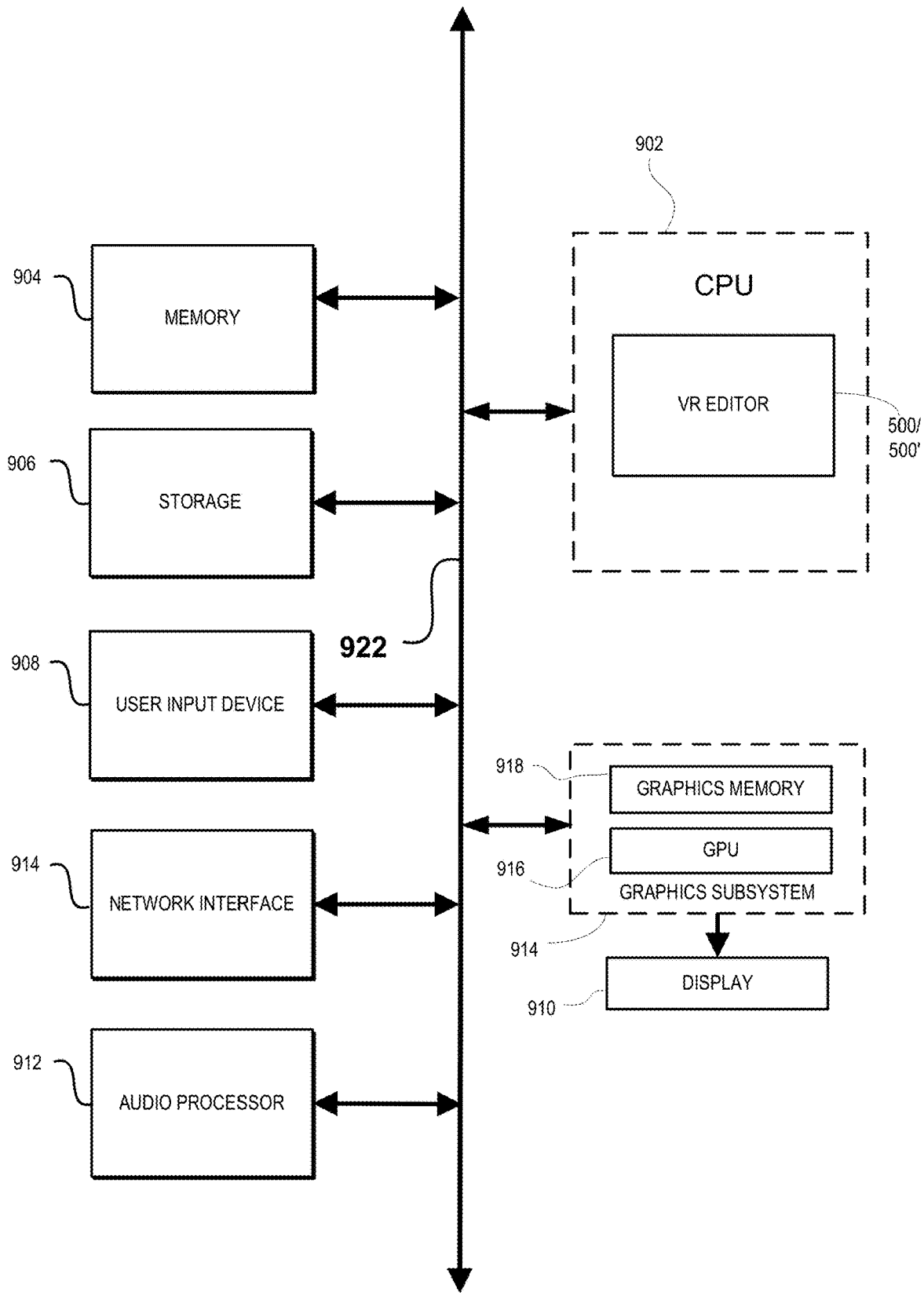
FIG. 9 illustrates components of an example device that can be used to perform aspects of the various embodiments of the present disclosure.

FIG. 9 illustrates components of an example device 900 that can be used to perform aspects of the various embodiments of the present disclosure. For example, FIG. 9 illustrates an exemplary hardware system suitable for implementing a device that provides services in support of a user, wherein the device may be configured to provide a 3D editing space for editing 3D digital content, such as 3D gaming environments of a gaming applications, 3D videos, etc., wherein the 3D editing space allows for real-time viewing of the results of the editing process, such that the editor can make edits while wearing an HMD configured for stereoscopic or 3D viewing, and viewing of the results from the edits without removing the HMD, in accordance with one embodiment. This block diagram illustrates a device 900 that can incorporate or can be a personal computer, video game console, personal digital assistant, or other digital device, suitable for practicing an embodiment of the disclosure. Device 900 includes a central processing unit (CPU) 902 for running software applications and optionally an operating system. CPU 902 may be comprised of one or more homogeneous or heterogeneous processing cores. For example, CPU 902 is one or more general-purpose microprocessors having one or more processing cores. Further embodiments can be implemented using one or more CPUs with microprocessor architectures specifically adapted for highly parallel and computationally intensive applications, such as media and interactive entertainment applications, or applications configured for editing of 3D digital content, such as by VR editor 500/500'.

Memory 904 stores applications and data for use by the CPU 902. Storage 906 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 908 communicate user inputs from one or more users to device 900, examples of which may include keyboards, mice, joysticks, touch pads, touch screens, still or video recorders/cameras, tracking devices for recognizing gestures, and/or microphones. Network interface 914 allows device 900 to communicate with other computer systems via an electronic communications network, and may include wired or wireless communication over local area networks and wide area networks such as the internet. An audio processor 912 is adapted to generate analog or digital audio output from instructions and/or data provided by the CPU 902, memory 904, and/or storage 906. The components of device 900, including CPU 902, memory 904, data storage 906, user input devices 908, network interface 910, and audio processor 912 are connected via one or more data buses 922

A graphics subsystem 914 is further connected with data bus 922 and the components of the device 900. The graphics subsystem 914 includes a graphics processing unit (GPU) 916 and graphics memory 918. Graphics memory 918 includes a display memory (e.g., a frame buffer) used for storing pixel data for each pixel of an output image. Graphics memory 918 can be integrated in the same device as GPU 916, connected as a separate device with GPU 916, and/or implemented within memory 904. Pixel data can be provided to graphics memory 918 directly from the CPU 902. Alternatively, CPU 902 provides the GPU 916 with data and/or instructions defining the desired output images, from which the GPU 916 generates the pixel data of one or more output images. The data and/or instructions defining the desired output images can be stored in memory 904 and/or graphics memory 918. In an embodiment, the GPU 916 includes 3D rendering capabilities for generating pixel data for output images from instructions and data defining the geometry, lighting, shading, texturing, motion, and/or camera parameters for a scene. The GPU 916 can further include one or more programmable execution units capable of executing shader programs.

The graphics subsystem 914 periodically outputs pixel data for an image from graphics memory 918 to be displayed on display device 910, or to be projected by projection system 940. Display device 910 can be any device capable of displaying visual information in response to a signal from the device 900, including CRT, LCD, plasma, and OLED displays. Device 900 can provide the display device 910 with an analog or digital signal, for example.

Figure 10:
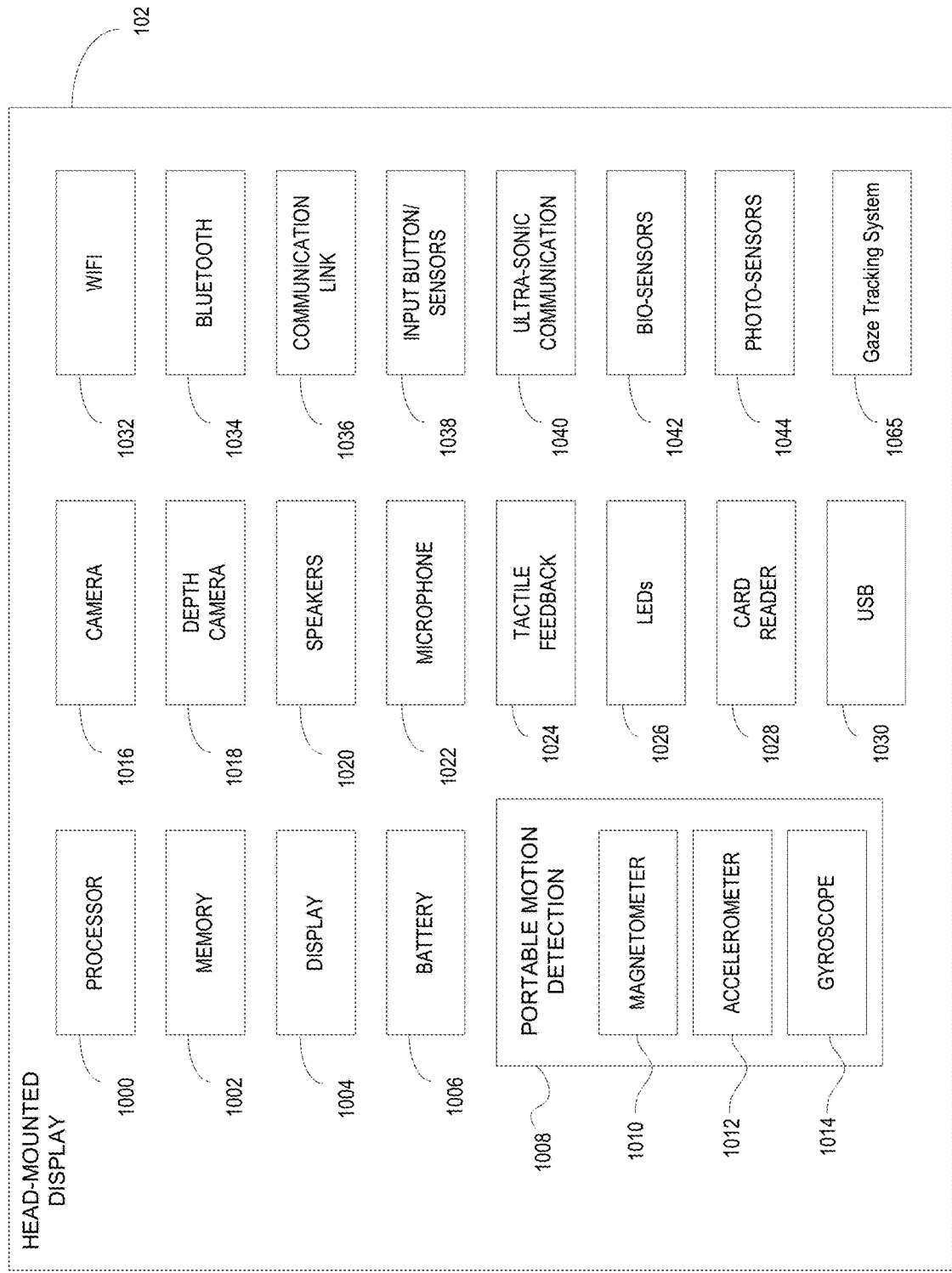
FIG. 10 is a diagram illustrating components of a head-mounted display, in accordance with an embodiment of the disclosure.

It should be understood that the embodiments described herein may be executed on any type of client device. In some embodiments, the client device is a head mounted display (HMD), or projection system. FIG. 10, a diagram illustrating components of a head-mounted display 102 is shown, in accordance with an embodiment of the disclosure. The HMD 102 may be configured to provide a 3D editing space for editing 3D digital content, such as 3D gaming environments of a gaming applications, 3D videos, etc., wherein the 3D editing space allows for real-time viewing of the results of the editing process, such that the editor can make edits while wearing an HMD 102 configured for stereoscopic or 3D viewing, and viewing of the results from the edits without removing the HMD 102.

The head-mounted display 102 includes a processor 1000 for executing program instructions. A memory 1002 is provided for storage purposes, and may include both volatile and non-volatile memory. A display 1004 is included which provides a visual interface that a user may view. A battery 1006 is provided as a power source for the head-mounted display 102. A motion detection module 1008 may include any of various kinds of motion sensitive hardware, such as a magnetometer 1010A, an accelerometer 1012, and a gyroscope 1014.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1012 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1010A are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1012 is used together with magnetometer 1010A to obtain the inclination and azimuth of the head-mounted display 102.

A gyroscope is a device for measuring or maintaining orientation, based on the principles of angular momentum. In one embodiment, three gyroscopes 1014 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1016 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1018 may be included in the head-mounted display 102 for sensing depth information of objects in a real environment.

In one embodiment, a camera integrated on a front face of the HMD may be used to provide warnings regarding safety. For example, if the user is approaching a wall or object, the user may be warned. In one embodiment, the use may be provided with an outline view of physical objects in the room, to warn the user of their presence. The outline may, for example, be an overlay in the virtual environment. In some embodiments, the HMD user may be provided with a view to a reference marker, that is overlaid in, for example, the floor. For instance, the marker may provide the user a reference of where the center of the room is, which in which the user is playing the game. This may provide, for example, visual information to the user of where the user should move to avoid hitting a wall or other object in the room. Tactile warnings can also be provided to the user, and/or audio warnings, to provide more safety for when the user wears and plays games or navigates content with an HMD.

The head-mounted display 102 includes speakers 1020 for providing audio output. Also, a microphone 1022 may be included for capturing audio from the real environment, including sounds from the ambient environment, speech made by the user, etc. The head-mounted display 102 includes tactile feedback module 1024 for providing tactile feedback to the user. In one embodiment, the tactile feedback module 1024 is capable of causing movement and/or vibration of the head-mounted display 102 so as to provide tactile feedback to the user.

LEDs 1026 are provided as visual indicators of statuses of the head-mounted display 102. For example, an LED may indicate battery level, power on, etc. A card reader 1028 is provided to enable the head-mounted display 102 to read and write information to and from a memory card. A USB interface 1030 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A Wi-Fi module 1032 is included for enabling connection to the Internet via wireless networking technologies. Also, the head-mounted display 102 includes a Bluetooth module 1034 for enabling wireless connection to other devices. A communications link 1036 may also be included for connection to other devices. In one embodiment, the communications link 1036 utilizes infrared transmission for wireless communication. In other embodiments, the communications link 1036 may utilize any of various wireless or wired transmission protocols for communication with other devices.

Input buttons/sensors 1038 are included to provide an input interface for the user. Any of various kinds of input interfaces may be included, such as buttons, touchpad, joystick, trackball, etc. An ultra-sonic communication module 1040 may be included in head-mounted display 102 for facilitating communication with other devices via ultra-sonic technologies.

Bio-sensors 1042 are included to enable detection of physiological data from a user. In one embodiment, the bio-sensors 1042 include one or more dry electrodes for detecting bio-electric signals of the user through the user's skin.

Photo-sensors 1044 are included to respond to signals from emitters (e.g., infrared base stations) placed in a 3-dimensional physical environment. The gaming console analyzes the information from the photo-sensors 1044 and emitters to determine position and orientation information related to the head-mounted display 102.

In addition, gaze tracking system 165' is included and configured to enable tracking of the gaze of the user. For example, system 165' may include gaze tracking cameras which captures images of the user's eyes, which are then analyzed to determine the gaze direction of the user. In one embodiment, information about the gaze direction of the user can be utilized to affect the video rendering. Video rendering in the direction of gaze can be prioritized or emphasized, such as by providing greater detail, higher resolution through foveated rendering, higher resolution of a particle system effect displayed in the foveal region, lower resolution of a particle system effect displayed outside the foveal region, or faster updates in the region where the user is looking.

The foregoing components of head-mounted display 102 have been described as merely exemplary components that may be included in head-mounted display 102. In various embodiments of the disclosure, the head-mounted display 102 may or may not include some of the various aforementioned components. Embodiments of the head-mounted display 102 may additionally include other components not presently described, but known in the art, for purposes of facilitating aspects of the present disclosure as herein described.

It will be appreciated by those skilled in the art that in various embodiments of the disclosure, the aforementioned head mounted device may be utilized in conjunction with an interactive application displayed on a display to provide various interactive functions. The exemplary embodiments described herein are provided by way of example only, and not by way of limitation.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the invention also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method for editing, comprising:
   receiving a sequence of interactive virtual reality (VR) scenes of digital content, each interactive VR scene showing a three-dimensional (3D) gaming environment;
   generating a 360 degree stereoscopic view of the sequence of interactive VR scenes from a point on a central axis;
   placing the 360 degree stereoscopic view of the sequence of interactive VR scenes within a 3D editing space, wherein the sequence of interactive VR scenes is arranged as a helix in the 3D editing space, the helix centered along the central axis, wherein each of the interactive VR scenes face inwards towards the central axis, wherein the helix can be rotated or shifted vertically to a desired position within the sequence of interactive VR scenes with reference to the point on the central axis;
   sending the 360 degree stereoscopic view within the 3D editing space including at least one of the sequence of interactive VR scenes to a head mounted display (HMD) for viewing by a user, such that the sequence of interactive VR scenes is viewed from within the helix from the point on the central axis;
   receiving at least one input editing command from a device of the user; and
   modifying the sequence of interactive VR scenes in response to the at least one input editing command,
   wherein the at least one input editing command is provided through the device while wearing the HMD and viewing the 3D editing space via the HMD so as to provide real-time views showing modifications made to the sequence of interactive VR scenes.

2. The method of claim 1, further comprising:
   receiving a selection of a first interactive VR scene;
   accessing a first set of sub-scenes corresponding to the first interactive VR scene, wherein each of the sequence of interactive VR scenes comprises one or more sub-scenes;
   placing the first set of sub-scenes in the 360 degree stereoscopic view within the 3D editing space for sending to the HMD; and
   modifying at least one of the sub-scenes in response to the at least one input editing command.

3. The method of claim 1, further comprising:
   providing a 3D view into the 3D gaming environment within the 3D editing space to view the modifications made to the sequence of interactive VR scenes.

4. The method of claim 1, wherein the modifying the sequence of interactive VR scenes includes:
   adding a transition between a first interactive VR scene and a second interactive VR scene.

5. The method of claim 1, wherein the modifying the sequence of interactive VR scenes includes:
   grabbing a first interactive VR scene in the sequence of interactive VR scenes; and
   moving the first interactive VR scene to another location in the sequence of interactive VR scenes.

6. The method of claim 1, wherein the modifying the sequence of interactive VR scenes includes:
   removing a first interactive VR scene in the sequence of interactive VR scenes.

7. The method of claim 1, wherein the modifying the sequence of interactive VR scenes includes:
   grabbing a new interactive VR scene from an interface in the 3D editing space showing at least one of a plurality of new interactive VR scenes; and
   adding the new interactive VR scene to a selected location in the sequence of interactive VR scenes.

8. The method of claim 1, wherein the at least one input editing command comprises a hand gesture.

9. The method of claim 1, wherein the at least one input editing command comprises an audio command.

10. A method for editing, comprising:
    receiving a sequence of interactive virtual reality (VR) scenes of digital content, each interactive VR scene showing a three-dimensional (3D) gaming environment;
    placing the sequence of interactive VR scenes within a 3D editing space, including:
       arranging the sequence of interactive VR scenes in the form of a helix, the sequence having at least a beginning VR scene and an end VR scene, the helix having a central axis, wherein each of the interactive VR scenes face inwards towards the central axis;
       generating a 360 degree stereoscopic view of the sequence of interactive VR scenes from a point on the central axis; and
       placing the 360 degree stereoscopic view in the 3D editing space, wherein a horizontal plane intersects the point and a focal interactive VR scene in the sequence of interactive VR scenes;
    sending a view of the 3D editing space including at least one of the sequence of interactive VR scenes to an HMD for viewing by a user;
    receiving at least one input editing command from an input enabled device of the user; and
    modifying the sequence of interactive VR scenes in response to the at least one input editing command,
    wherein the at least one input editing command is provided through the input enabled device while wearing the HMD and viewing the 3D editing space via the HMD so as to provide real-time views showing modifications made to the sequence of interactive VR scenes.

11. The method of claim 1, further comprising:
    receiving a viewing command from the device of the user; and
    rotating the helix including the sequence of interactive VR scenes clockwise or counter-clockwise to change a focal interactive VR scene, wherein a horizontal plane interact the point and the focal interactive VR scene in the sequence of interactive VR scenes.

12. The method of claim 1, further comprising:
    receiving a viewing command from the device of the user; and
    vertically moving the helix including the sequence of interactive VR scenes to change a focal interactive VR scene, wherein a horizontal plane interact the point and the focal interactive VR scene in the sequence of interactive VR scenes.

13. A non-transitory computer-readable medium storing a computer program for editing, the computer-readable medium comprising:
    program instructions for receiving a sequence of interactive virtual reality (VR) scenes of digital content, each interactive VR scene showing a three-dimensional (3D) gaming environment;

program instructions for generating a 360 degree stereoscopic view of the sequence of interactive VR scenes from a point on a central axis;

program instructions for placing the 360 degree stereoscopic view of the sequence of interactive VR scenes within a 3D editing space, wherein the sequence of interactive VR scenes is arranged as a helix in the 3D editing space, the helix centered along the central axis, wherein each of the interactive VR scenes face inwards towards the central axis, wherein the helix can be rotated or shifted vertically to a desired position within the sequence of interactive VR scenes with reference to the point on the central axis;

program instructions for sending the 360 degree stereoscopic view within the 3D editing space including at least the sequence of interactive VR scenes to a head mounted display (HMD) for viewing by a user, such that the sequence of interactive VR scenes is viewed from within the helix from the point on the central axis;

program instructions for receiving at least one input editing command from a device of the user; and program instructions for modifying the sequence of interactive VR scenes in response to the at least one input editing command, wherein the at least one input editing command is provided through the device while wearing the HMD and viewing the 3D editing space via the HMD so as to provide real-time views showing modifications made to the sequence of interactive VR scenes.

14. The computer-readable medium of claim 13, further comprising:

program instructions for providing a 3D view into the 3D gaming environment within the 3D editing space to view the modifications made to the sequence of interactive VR scenes.

15. The computer-readable medium of claim 13, wherein the program instructions for modifying the sequence of interactive VR scenes includes:

program instructions for adding a transition between a first interactive VR scene and a second interactive VR scene.

16. The computer-readable medium of claim 13, wherein the program instructions for modifying the sequence of interactive VR scenes includes:

program instructions for grabbing a first interactive VR scene in the sequence of interactive VR scenes; and program instructions for moving the first interactive VR scene to another location in the sequence of interactive VR scenes.

17. The computer-readable medium of claim 13, wherein the program instructions for modifying the sequence of interactive VR scenes includes:

program instructions for removing a first interactive VR scene in the sequence of interactive VR scenes.

18. The computer-readable medium of claim 13, wherein the program instructions for modifying the sequence of interactive VR scenes includes:

program instructions for grabbing a new interactive VR scene from an interface in the 3D editing space showing at least one of a plurality of new interactive VR scenes; and program instructions for adding the new interactive VR scene to a selected location in the sequence of interactive VR scenes.

19. The computer-readable medium of claim 13, wherein the 3D editing space includes an inner region configured for editing of the sequence of interactive VR scenes placed in the inner region, wherein the 3D editing space includes an outer region showing the 3D gaming environment being modified through the editing of the sequence of interactive VR scenes, wherein the outer region is shown as a background to the inner region.

20. A computer system comprising:

a processor; and memory coupled to the processor and having stored therein instructions that, if executed by the computer system, cause the computer system to execute a method for editing comprising:

receiving a sequence of interactive virtual reality (VR) scenes of digital content, each interactive VR scene showing a three-dimensional (3D) gaming environment;

generating a 360 degree stereoscopic view of the sequence of interactive VR scenes from a point on a central axis;

placing the 360 degree stereoscopic view of the sequence of interactive VR scenes within a 3D editing space, wherein the sequence of interactive VR scenes is arranged as a helix in the 3D editing space, the helix centered along the central axis, wherein each of the interactive VR scenes face inwards towards the central axis, wherein the helix can be rotated or shifted vertically to a desired position within the sequence of interactive VR scenes with reference to the point on the central axis;

sending the 360 degree stereoscopic view within the 3D editing space including at least one of the sequence of interactive VR scenes to a head mounted display (HMD) for viewing by a user, such that the sequence of interactive VR scenes is viewed from within the helix from the point on the central axis;

receiving at least one input editing command from a device of the user; and modifying the sequence of interactive VR scenes in response to the at least one input editing command, wherein the at least one input editing command is provided through the device while wearing the HMD and viewing the 3D editing space via the HMD so as to provide real-time views showing modifications made to the sequence of interactive VR scenes.

21. The computer system of claim 20, wherein the method further comprises:

providing a 3D view into the 3D gaming environment within the 3D editing space to view the modifications made to the sequence of interactive VR scenes.

* * * * *